(12) United States Patent
Adibowo

(10) Patent No.: US 12,008,661 B2
(45) Date of Patent: Jun. 11, 2024

(54) SOCIAL MEDIA MANAGEMENT PLATFORM

(71) Applicant: SAP SE, Walldorf (DE)

(72) Inventor: Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/675,092

(22) Filed: Feb. 18, 2022

(65) Prior Publication Data

US 2023/0267558 A1    Aug. 24, 2023

(51) Int. Cl.
     *G06Q 10/00*      (2023.01)
     *G06Q 30/016*      (2023.01)
     *G06Q 50/00*      (2012.01)

(52) U.S. Cl.
     CPC ........... *G06Q 50/01* (2013.01); *G06Q 30/016* (2013.01)

(58) Field of Classification Search
     CPC ............................ G06Q 50/01; G06Q 30/016
     See application file for complete search history.

(56) References Cited

U.S. PATENT DOCUMENTS

| | | | |
|---|---|---|---|
| 10,635,502 B2 | 4/2020 | Adibowo | |
| 10,684,941 B2 | 6/2020 | Adibowo | |
| 11,042,562 B2 | 6/2021 | Adibowo | |
| 2015/0100326 A1 | 4/2015 | Kowalkiewicz et al. | |
| 2015/0100382 A1 | 4/2015 | Malhotra et al. | |
| 2015/0176997 A1 | 6/2015 | Pursche et al. | |
| 2015/0269642 A1 | 9/2015 | Cai et al. | |
| 2015/0381937 A1 | 12/2015 | Adibowo | |
| 2017/0017635 A1* | 1/2017 | Leliwa | G06F 40/258 |
| 2018/0060953 A1 | 3/2018 | Adibowo | |
| 2018/0240038 A1 | 8/2018 | Adibowo et al. | |
| 2018/0260693 A1 | 9/2018 | Dahlmeier et al. | |
| 2019/0279073 A1 | 9/2019 | Adibowo | |
| 2020/0134440 A1 | 4/2020 | Adibowo | |
| 2020/0193057 A1* | 6/2020 | Yu | G06N 3/006 |
| 2020/0387871 A1 | 12/2020 | Adibowo | |

(Continued)

OTHER PUBLICATIONS

Laura "How Do Facebook Messenger Bots for Business Work?" Jun. 9, 2021. Retrieved at https://meetedgar.com/blog/how-facebook-messenger-bots-work-and-if-theyre-right-for-you/. (Year: 2021).*

(Continued)

*Primary Examiner* — Gabrielle A McCormick

(74) *Attorney, Agent, or Firm* — Fish & Richardson P.C.

(57) ABSTRACT

Methods, systems, and computer-readable storage media for receiving, by a social media management platform, an incoming message on a social media platform of a plurality of social media platforms, determining an enterprise of the plurality of enterprises that the incoming message is directed to, determining a class of the incoming message from a set of classes, generating, by one of a public relations (PR) bot and a social bot of the social media management platform, a first reply to the message based on the class of the incoming message, the PR bot and the social bot each being specific to the enterprise and at least partially controlling a social media account of the enterprise on the social media platform, and posting, by the one of the PR bot and the social bot, the first reply to the incoming message on the social media platform using the social media account.

17 Claims, 19 Drawing Sheets

(56) References Cited

U.S. PATENT DOCUMENTS

2022/0138753 A1* 5/2022 Wright ............... G06Q 20/4016
705/44

OTHER PUBLICATIONS

Brant Barnhart. "How to set up social media automation to save serious time". May 4, 2020. Retrieved at https://sproutsocial.com/insights/social-media-automation/ (Year: 2020).*

U.S. Appl. No. 17/142,407, Adibowo, filed Jan. 6, 2021.

Abokhodair et al., "Dissecting a social botnet: Growth, content and influence in Twitter" Proceedings of the 18th ACM conference on computer supported cooperative work & social computing, Feb. 2015, 16 pages.

Akram et al., "A study on positive and negative effects of social media on society" International Journal of Computer Sciences and Engineering 5.10, Oct. 2017, 9 pages.

Alexandridis et al., "A Survey on Sentiment Analysis and Opinion Mining in Greek Social Media" Information 12.8, Aug. 2021, 17 pages.

Azure.microsoft.com [online], "Introducing Azure Functions" Mar. 31, 2016, [retrieved on Nov. 2, 2021], retrieved from : URL <https://azure.microsoft.com/en-us/blog/introducing-azure-functions/>, 8 pages.

Brachten et al., "Strategies and Influence of Social Bots in a 2017 German state election—A case study on Twitter" arXiv preprint arXiv:1710.07562, Oct. 2017, 13 pages.

Bunewsservice.com [online], "Social stock: how social media and influencers affect financial markets" Feb. 17, 2021, [retrieved on Nov. 12, 2021], retrieved from : URL <https://bunewsservice.com/socialstock-how-social-media-and-influencers-affect-financial-markets/>, 4 pages.

Businessinsider.com [online], "The Life and Sudden Death of "Flappy Bird": How a Guy Making $50,000 Per Day Grew to "Hate" His Own Game" Jul. 28, 2017, [retrieved on Nov. 1, 2021] retrieved from : URL <https://www.businessinsider.com/why-flappy-birds-shutdown-2014-2?international=true&r=US&IR=T>, 15 pages.

Cbsnews.com [online], ""Boycott Mulan" trends on Twitter after credits reveal region of China where movie was filmed" Sep. 9, 2020, [retrieved on Nov. 12, 2021], retrieved from : URL <https://www.cbsnews.com/news/boycott-mulan-china-uyghur-muslims-xinjian-hong-kong/>, 5 pages.

Clustertech.com [online], "PRISMA Crisis Intelligence" 2018, [retrieved on Jun. 30, 2021], retrieved from : URL <https://www.clustertech.com/sites/default/files/Download%20Materials/Crisis%20Intelligence/Brochure-PRISMA%20Crisis%20Intelligence.pdf>, 2 pages.

Cnbc.com [online], "Amazon employees call for company to cut ties with Parler after deadly U.S. Capitol riot" Jan. 10, 2021, [retrieved on Nov. 12, 2021], retrieved from : URL <https://www.cnbc.com/2021/01/09/amazonemployees-demand-company-drop-parler-after-capitol-riot.html>, 3 pages.

Cnbc.com [online], "Elon Musk's tweets are moving markets—and some investors are worried" Jan. 29, 2021, [retrieved on Sep. 17, 2021], retrieved from : URL <https://www.cnbc.com/2021/01/29/elon-musks-tweets-are-moving-markets.html>, 5 pages.

Commetric.com [online], "Brand Boycotts: Lessons From the Latest Social Media Storms" Oct. 5, 2020, [retrieved on Nov. 12, 2021], retrieved from : URL <https://commetric.com/2020/10/05/consumer-boycotts-lessonsfrom-the-latest-social-media-storms/>, 9 pages.

Deusser et al., "Buzz in social media: Detection of short-lived viral phenomena." Companion Proceedings of the The Web Conference 2018, Apr. 2018, 8 pages.

DigitalGenius.com [online], "KLM Transforms Social Customer Service with DigitalGenius AI" Feb. 14, 2020, [retrieved on Nov. 12, 2021], retrieved from : URL <https://www.digitalgenius.com/klm-transforms-socialcustomer-service-with-digitalgenius/>, 2 pages.

Forbes.com [online], "Snapchat's $1.3 Billion Drop in Value Is Linked to a Kardashian. Forbes" May 31, 2018, [retrieved on 9/31/2021], retrieved from : URL <https://www.forbes.com/sites/meganhills1/2018/02/23/snapchatstock-value/>, 3 pages.

Forbes.com [online], "Wayfair Employees' Protest of Sales to Detention Centers Could Backfire on Them" Jul. 2, 2019, [retrieved on Sep. 13, 2021], retrieved from : URL <https://www.forbes.com/sites/jackkelly/2019/07/02/wayfair-employees-protest-of-sales-to-detention-centers-could-backfire-on-them/>, 3 pages.

Graham et al., "The Sociomateriality of Rating and Ranking Devices on Social Media: A Case Study of Reddit's Voting Practices." Social Media+ Society 7.3, 20563051211047667, Sep. 2021, 12 pages.

Guyant et al., "Manager's Tough Questions Answer Book" Prentice Hall Direct. ISBN 978-0132265157, Apr. 1999, 1 pages (Abstract only).

Hochreiter et al., "Long short-term memory" Neural computation 9.8, Nov. 1997, 46 pages.

Hutto et al., "VADER: A Parsimonious Rule-based Model for Sentiment Analysis of Social Media Text" Proceedings of the Eighth International AAAI Conference on Weblogs and Social Media, May 2014, 10 pages.

Investopedia.com [online], "The 8 Best Social Media Management Software of 2021"Sep. 11, 2021, [retrieved on Nov. 12, 2021], retrieved from : URL <https://www.investopedia.com/best-social-mediamanagement-software-5087716>, 16 pages.

Knowyourmeme.com [online], "Downvote to oblivion! [Internet Meme]" Sep. 1, 2018, [retrieved on Oct. 29, 2021], retrieved from : URL <https://knowyourmeme.com/photos/1406592-know-yourmeme--3>, 1 page.

Kowalczyk et al., "Scalable privacy-compliant virality prediction on twitter" arXiv preprint arXiv:1812.06034 , Dec. 2018, 16 pages.

Li et al., "Dice loss for data-imbalanced NLP tasks." arXiv preprint arXiv:1911.02855, Nov. 2019, 12 pages.

Liu et al., "Roberta: A robustly optimized bert pretraining approach." arXiv preprint arXiv:1907.11692, Jul. 2019, 13 pages.

Manuelita Maldonado Ardila, "The Rise of Intelligent Machines: How Artificial Intelligence Is Transforming the Public Relations Industry" Diss. University of Southern California, May 2020, 79 pages.

Marketingdive.com [online], "These 5 companies have social media command centers down to a science" Apr. 17, 2014, [retrieved on Feb. 9, 2022], retrieved from : URL <https://www.marketingdive.com/news/these-5-companies-have-social-media-command-centers-down-to-a-science/251722/>, 6 pages.

Mihalcea et al., "TextRank: Bringing Order into Text, EMNLP." 2004, 8 pages.

Money.CNN.com [online], "Target's $20 million answer to transgender bathroom boycott" Aug. 17, 2016, [retrieved on Nov. 12, 2021], retrieved from : URL <https://money.cnn.com/2016/08/17/news/companies/targetbathroom-transgender/index.html>, 3 pages.

Npr.org [online], "How to Meddle in an Election" May 24, 2019, [retrieved on Nov. 12, 2021], retrieved from : URL <https://www.npr.org/2019/05/24/726536757/episode-915-how-tomeddle-in-an-election>, 22 pages.

Panda et al., "Artificial intelligence: A strategic disruption in public relations" Journal of Creative Communications 14.3, Nov. 2019, 18 pages.

Peters et al., "Deep contextualized word representations" https://arxiv.org/abs/1802.05365, Mar. 2018, 15 pages.

Ranco et al., "The effects of Twitter sentiment on stock price returns" PloS one 10.9, Sep. 2015, 21 pages.

Santini et al., "Software power as soft power. A literature review on computational propaganda effects in public opinion and political process." Partecipazione e conflitto 11.2, Jul. 2018, 30 pages.

Sap.com [online], "Business Entity Recognition" Oct. 11, 2021, [retrieved on Oct. 25, 2021], retrieved from : URL <https://help.sap.com/viewer/b43f8f61368d455793a241d2b10baeb2/SHIP/en-US/894afc838ee54c0f8c7f7381a9dae27a.html>, 72 pages.

Sap.com [online], "Service Ticket Intelligence"Oct. 15, 2021, [retrieved on Oct. 15, 2021], retrieved from : URL <https://help.sap.com/viewer/934ccff77ddb4fa2bf268a0085984db0/SHIP/en-US/2f0e49ac91c24d54acb694d967e0cfc0.html>, 1 page.

Schiller et al., "Stance detection benchmark: How robust is your stance detection?" KI—Künstliche Intelligenz 35.3, Nov. 2021, 13 pages.

(56) References Cited

OTHER PUBLICATIONS

See et al., "Get to the point: Summarization with pointer-generator networks." arXiv preprint arXiv:1704.04368, Apr. 2017, 20 pages.
Shehata et al., "How can a tweet affect the e-reputation of a company ?. " Journal of Internet Social Networking and Virtual Communities 2017, Nov. 2017, 13 pages.
Techcrunch.com [online], "Twitter officially expands its character count to 280 starting today" Nov. 8, 2017, [retrieved on Oct. 11, 2021], retrieved from : URL <https://techcrunch.com/2017/11/07/twitter-officially-expands-its-character-count-to-280-starting-today/>, 6 pages.
Theguardian.com [online], "Do we still need boycotts when you can send an angry tweet?" Jul. 30, 2015, [retrieved on Nov. 12, 2021], retrieved from : URL <https://www.theguardian.com/sustainable-business/2015/jul/30/dowe-still-need-boycotts-companies-social-media>, 7 pages.
Velasco et al., "You are cancelled: Virtual collective consciousness and the emergence of cancel culture as ideological purging." Rupkatha Journal on Interdisciplinary Studies in Humanities 12.5, Sep. 2020, 7 pages.
Wadden et al., "Fact or fiction: Verifying scientific claims." arXiv preprint arXiv:2004.14974, Apr. 2020, 17 pages.
Wikipedia.org [online], "AWS Lambda" created on Sep. 7, 2015, [retrieved on Nov. 2, 2021], retrieved from : URL <https://en.wikipedia.org/w/index.php?title=AWS_Lambda&oldid=1049387543>, 10 pages.
Wikipedia.org [online], "Echo chamber (media)" created on Mar. 6, 2008, [retrieved on Nov. 2, 2021], retrieved from : URL <https://en.wikipedia.org/w/index.php?title=Echo_chamber_(media)&oldid=1050804243>, 32 pages.
Wikipedia.org [online], "Fiber-optic communication" created on Oct. 5, 2006, [retrieved on Sep. 17, 2021], retrieved from : URL <https://en.wikipedia.org/w/index.php?title=Fiberoptic_communication&oldid=1043741505>, 48 pages.
Wikipedia.org [online], "GPT-2"created on Dec. 8, 2020, [retrieved on Oct. 11, 2021], retrieved from : URL <https://en.wikipedia.org/w/index.php?title=GPT-2&oldid=1045053241>, 44 pages.
Wikipedia.org [online], "Interactive voice response" created on Dec. 28, 2002, [retrieved on Nov. 9, 2021], retrieved from : URL <https://en.wikipedia.org/w/index.php?title=Interactive_voice_response&oldid=1051032942>, 20 pages.
Wikipedia.org [online], "Named-entity recognition" created on May 18, 2005, [retrieved on Oct. 28, 2021], retrieved from : URL <https://en.wikipedia.org/w/index.php?title=Named-entity_recognition&oldid=1040289513>, 7 pages.
Wikipedia.org [online], "Negativity bias" created on Feb. 11, 2007, [retrieved on Sep. 17, 2021], retrieved from : URL <https://en.wikipedia.org/w/index.php?title=Negativity_bias&oldid=1044650013>, 29 pages.
Wikipedia.org [online], "Serverless computing" created on Jul. 10, 2016, [retrieved on Nov. 2, 2021], retrieved from : URL <https://en.wikipedia.org/w/index.php?title=Serverless_computing&oldid=1049963137>, 13 pages.
Wikipedia.org [online], "StyleGAN" created on Feb. 16, 2019, [retrieved on Oct. 8, 2021], retrieved from : URL <https://en.wikipedia.org/w/index.php?title=StyleGAN&oldid=1024713239>, 5 pages.
Wikipedia.org [online], "TF-IDF" created on Jun. 16, 2005, [retrieved on Oct. 11, 2021], retrieved from : URL <https://en.wikipedia.org/w/index.php?title=Tf%E2%80%93idf&oldid=1045057405>, 16 pages.
ZDNet.com [online], "Zignal Labs takes media intelligence real time" Aug. 11, 2021, [retrieved on Nov. 12, 2021], retrieved from : URL <https://www.zdnet.com/article/zignal-labs-takes-media-intelligence-real-time/>, 5 pages.

\* cited by examiner

SOCIAL MEDIA MANAGEMENT PLATFORM

BACKGROUND

Social media platforms have enabled a rapid spread of information across the globe. While often helpful, the spread of information can also be harmful. For example, users can spread opinions through social media platforms, which opinions can have an extensive reach across connected social media platforms. Negative opinions, for example, can spread globally almost instantaneously, also propelled by a tendency to register negative stimuli. As a result, a single social media post can have a significant impact, such as, for example, moving share prices of an enterprise despite no change in the enterprise's products, services, and/or quality thereof. Social media platforms also enable users to readily organize activism activities, which can be targeted at individuals and/or enterprises. In some cases, despite the activist discourse is irrelevant to an enterprise's products and/or services, and instead can be directed to other aspects of the enterprise (e.g., internal practices, vendor practices, practices of governments in territories where the company does business).

Further, information retrieval systems (IRSs), such as online search engines, frequently direct users to social media platforms for information responsive to search queries regarding an enterprise (e.g., products, services, employees of an enterprise) instead of directing users to the enterprise itself or public knowledge base articles published by the enterprise. Also, users can be mis-directed by IRSs in instances where official information from the enterprise is buried beyond the first few pages of search engine results and is overshadowed by results coming from public-view social media sites (e.g., Stack Exchange site, Reddit). As a result, having extensive publicly available knowledge bases is no longer sufficient for an enterprise as a channel to provide cost-effective detailed information of its products and/or services. The enterprise would need to take part in social media discourses and recommend specific knowledge base items when appropriate.

SUMMARY

Implementations of the present disclosure are directed to a social media management platform. More particularly, implementations of the present disclosure are directed to a social media management platform that provides autonomous social bots that selectively mitigate viral data spread across social media platforms as well as autonomous public relations (PR) bots that actively represent enterprises in social media platforms.

In some implementations, actions include receiving, by a social media management platform, an incoming message on a social media platform of a plurality of social media platforms, determining, by the social media management platform, an enterprise of the plurality of enterprises that the incoming message is directed to, determining, by the social media management platform, a class of the incoming message from a set of classes, generating, by one of a public relations (PR) bot and a social bot of the social media management platform, a first reply to the message based on the class of the incoming message, the PR bot and the social bot each being specific to the enterprise and at least partially controlling a social media account of the enterprise on the social media platform, and posting, by the one of the PR bot and the social bot, the first reply to the incoming message on the social media platform using the social media account. Other implementations of this aspect include corresponding systems, apparatus, and computer programs, configured to perform the actions of the methods, encoded on computer storage devices.

These and other implementations can each optionally include one or more of the following features: the class includes one of a question, a complaint, a compliment, a statement, and unknown; actions further include at least partially in response to determining that the class is one of a complaint, a statement, and unknown, determining a potential virality of the incoming message, comparing the potential virality of the incoming message to a threshold virality, and in response to determining that the potential virality exceeds a threshold virality, triggering a swarm of social bots to mitigate virality of the incoming message; triggering a swarm of social bots includes defining a set of social bots based on a maturity of social bots of the social media management platform, social bots in the set of social bots not being specific to the enterprise, filtering one or more social bots from the set of social bots to provide a sub-set of social bots, the one or more social bots being filtered based on a relevance of each social bot to the incoming message, and for at least one social bot in the sub-set of social bots, executing an action relative to the incoming message within the social media platform; the action includes posting a second reply to the incoming message within the social media platform, the second reply being included in a set of candidate replies automatically generated in response to the incoming message and being selected from the set of candidate replies based on respective confidence levels of candidate replies in the set of candidate replies; actions further include randomly selecting a mode for the social bot, and executing, by the social bot, at least one activity within one or more of the social media platforms responsive to the mode, the at least one activity including one or more of connecting with one or more social media accounts in the one or more of the social media platforms, interacting with one or more social media accounts in the one or more of the social media platforms, discovering one or more articles, publishing one or more posts within the one or more social media platforms based on the one or more articles, and publishing one or more posts within the one or more social media platforms based on a generated opinion; and publishing one or more posts within the one or more social media platforms based on the one or more articles and publishing one or more posts within the one or more social media platforms based on a generated opinion each at least partially includes processing an article through one or more ML models to generate an article summary, an article excerpt, and an opinion statement on the article, and publishing at least one post including one or more of the article summary, the article excerpt, and the opinion statement.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
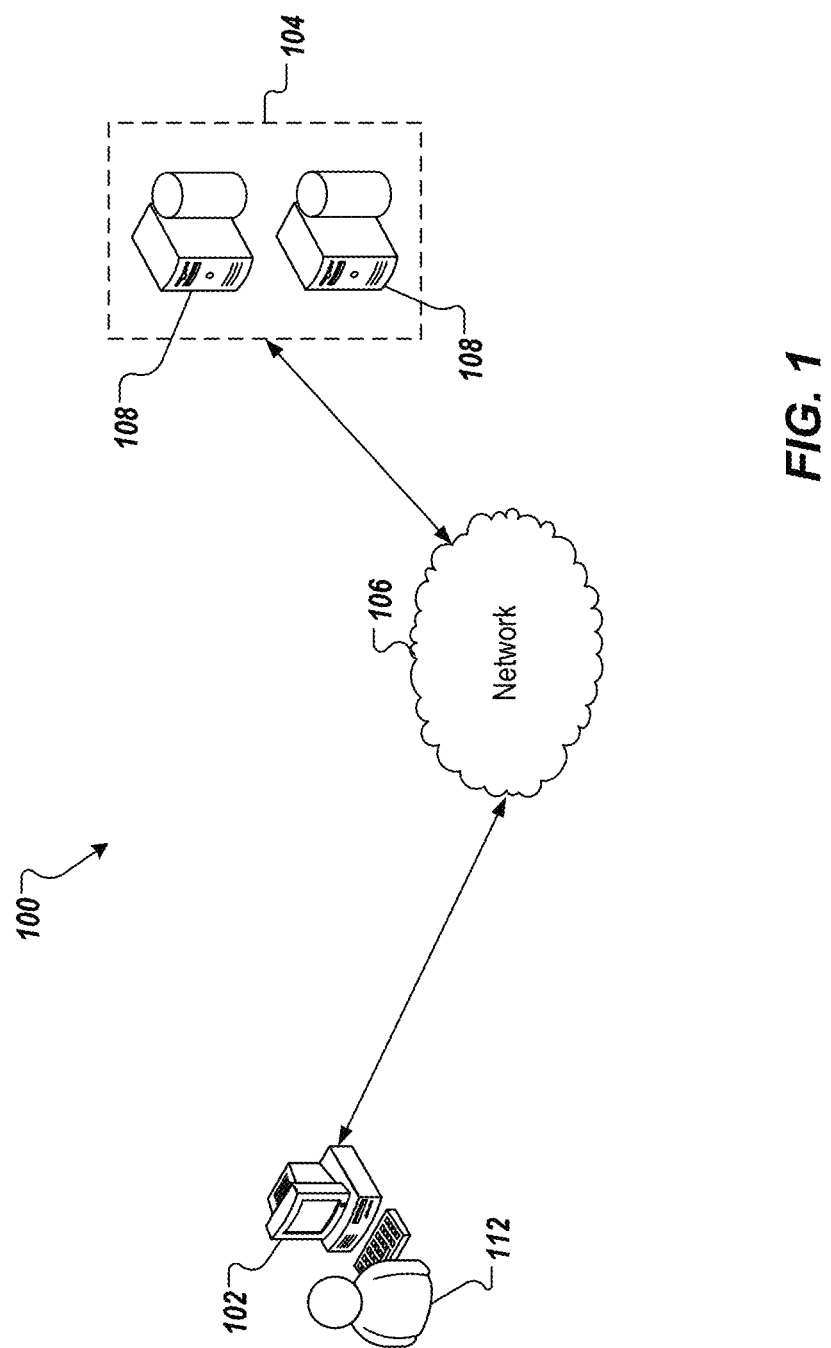
FIG. 1 depicts an example architecture that can be used to execute implementations of the present disclosure.

Implementations of the present disclosure are directed to a social media management platform. More particularly, implementations of the present disclosure are directed to a social media management platform that provides autonomous social bots that selectively mitigate viral data spread across social media platforms. Implementations can include actions of receiving, by a social media management platform, an incoming message on a social media platform of a plurality of social media platforms, determining, by the social media management platform, an enterprise of the plurality of enterprises that the incoming message is directed to, determining, by the social media management platform, a class of the incoming message from a set of classes, generating, by one of a public relations (PR) bot and a social bot of the social media management platform, a first reply to the message based on the class of the incoming message, the PR bot and the social bot each being specific to the enterprise and at least partially controlling a social media account of the enterprise on the social media platform, and posting, by the one of the PR bot and the social bot, the first reply to the incoming message on the social media platform using the social media account.

To provide further context for implementations of the present disclosure, and as introduced above, social media platforms have enabled a rapid spread of information across the globe. While often helpful, the spread of information can also be harmful. For example, users can spread opinions through social media platforms, which opinions can have an extensive reach across connected social media platforms. Negative opinions, for example, can spread globally almost instantaneously, also propelled by a tendency to register negative stimuli. As a result, a single social media post can have a significant impact, such as, for example, moving share prices of an enterprise despite no change in the enterprise's products, services, and/or quality thereof. Social media platforms also enable users to readily organize activism activities, which can be targeted at individuals and/or enterprises. In some cases, despite the activist discourse is irrelevant to an enterprise's products and/or services, and instead can be directed to other aspects of the enterprise (e.g., internal practices, vendor practices, practices of governments in territories where the company does business).

Further, information retrieval systems (IRSs), such as online search engines, frequently direct users to social media platforms for information responsive to search queries regarding an enterprise (e.g., products, services, employees of an enterprise) instead of directing users to the enterprise itself or public knowledge base articles published by the enterprise. Also, users can be mis-directed by IRSs in instances where official information from the enterprise is buried beyond the first few pages of search engine results and is overshadowed by results coming from public-view social media sites (e.g., Stack Exchange site, Reddit). As a result, having extensive publicly available knowledge bases is no longer sufficient for an enterprise as a channel to provide cost-effective detailed information of its products and/or services. The enterprise would need to take part in social media discourses and recommend specific knowledge base items when appropriate.

Enterprises can work to have deep links to their public knowledge bases surface more prominently in search results for improved visibility. That is, when an IRS sees a social media conversation linking to a knowledge base article, the IRS provides a higher rank to the article for searches that are similar to the social media conversation. This mechanism is called ranking through backlinks and is a common method in which many search engines present their results.

When agents of the enterprise take part in social media conversations and post deep links to the relevant knowledge base articles, they are essentially creating more backlinks to those articles. Undeniably, the more relevant those articles to the conversation at hand, the more appreciative both social media users and search engines alike to those articles, agents, and the enterprise in general. Nevertheless, maintaining a dedicated department of product experts to monitor social media conversations in order to interject with knowledge base articles can be prohibitively expensive and demand technical resources to achieve.

Social media platforms increasingly serve as channels for users to voice complaints about an enterprise's products and/or services. Markedly these posts are prevalent on public-view social media networks. However, because such complaints do not go into an enterprise's official support system (i.e., by the customer creating a product support ticket), this behavior further increases the gap between issue and remedy. Further, without a way to analyze these issues, teams of the enterprise who are responsible to improve such products and/or services are not be able to gain feedback, which impedes their ability to improve such products/services.

It can also be noted that, frequently, the majority of complaints lodged through social media tend to be trivial, known issues, or false positives. Applying standard processing on every social media post that is remotely relevant could be prohibitively expensive with respect to human intelligence labor and technical resources. Accordingly, there needs to be a cost- and resource-efficient means for enterprises to triage such public complaints and provide an official response, if necessary.

Social media platforms have also led to a loss of notion of "office hours" or "holiday periods." Customers tend to post complaints through social media channels at any time and at any day yet expect a quick turnaround. Keeping fully staffed squads of social media support specialists who work 24/7/365 can be prohibitively expensive and require significant infrastructure in terms of technical resources to maintain. The spread of misinformation through social media channels presents a similar problem in that enterprises would need to participate in such discourse and provide corrections or disclaimers as necessary. On the negative side, keeping up with all of these social media activities can be cost-prohibitive and require an impractical technical infrastructure to support.

In view of the above context, implementations of the present disclosure provide a social media management platform that can be used by enterprises to manage social media activity across multiple social media networks (e.g., Twitter, Facebook, LinkedIn, Reddit). In some examples, the social media management platform is provided in a software-as-a-service (SaaS) paradigm that enterprises subscribe to. Through the social media management platform, enterprises are able to manage perceptions towards respective products, services, and/or public-facing employees.

In some implementations, the social media management platform serves as an automatic first-responder through social media accounts of an enterprise. In some examples, the social media management platform automatically interacts with social networks (e.g., respond to enquiries) through one or more automatically managed social media accounts in parallel with traditional approaches (e.g., human users operating social media accounts on behalf of the enterprise). For example, and as described in further detail herein, the social media management platform provides one or more bot engines that interact with social networks in a manner that is transparent to the general public (i.e., the bot engines are perceived as human users).

In some implementations, the social media management platform proactively searches social media networks for content (e.g., posts by users) that expresses challenges and/or that seeks solutions, for example, having relevance to the enterprise's products, services, and/or people. In some examples, the social media management platform responds with solutions derived from one or more knowledge bases of the enterprise. In this manner, the social media management platform autonomously and actively engages the general public and extends a helping hand whenever opportunity arises.

In some implementations, the social media management platform of the present disclosure cultivates a pool of social media profiles that can be unrelated to any of the enterprises. In some instances, social media profiles in the pool of social media profiles can act in concert as a so-called social bot swarm to enhance messages about an enterprise, for example. For example, the social bot swarm can be invoked to mitigate negativity directed to an enterprise (e.g., prevent content from becoming viral) and/or to propel positivity. The social media profiles that make up the pool are operated by respective autonomous bots. To this end, each autonomous bot creates its own content and engages with others in the social media networks in times when the autonomous bot is not enrolled as part of a social bot swarm. Each autonomous bot has its own profile, interests, collection of web content, social media network connections, and the like.

As described in further detail herein, the social media management platform operates in multiple operational modes. Example operational modes include assist, correct, deflect, distract, reverberate. In assist, the social media management platform automatically provides solutions when available and/or helps users to get in touch with official technical support or customer assistance channels. In correct, the social media management platform automatically fact-checks statements and points to authoritative sources. In deflect, the social media management platform can automatically respond to negative sentiment by, for example, asking for forgiveness or providing a response without answering. In distract, the social media management platform can automatically apply counteractive social pressure through, for example, a social bot swarm. In reverberate, the social media management platform can automatically signal social approval on positive messages through a social bot swarm.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host a social media management platform that can assist enterprises in managing social media presence and automatically react to and/or publish social media content across multiple social media networks. As described in further detail herein, the social media management platform: automatically provides solutions when available and/or helps users to get in touch with official technical support or customer assistance channels; automatically fact-checks statements and points to authoritative sources; automatically responds to negative sentiment; automatically applies counteractive social pressure; and automatically signals social approval on positive messages through a social bot swarm.

Figure 2:
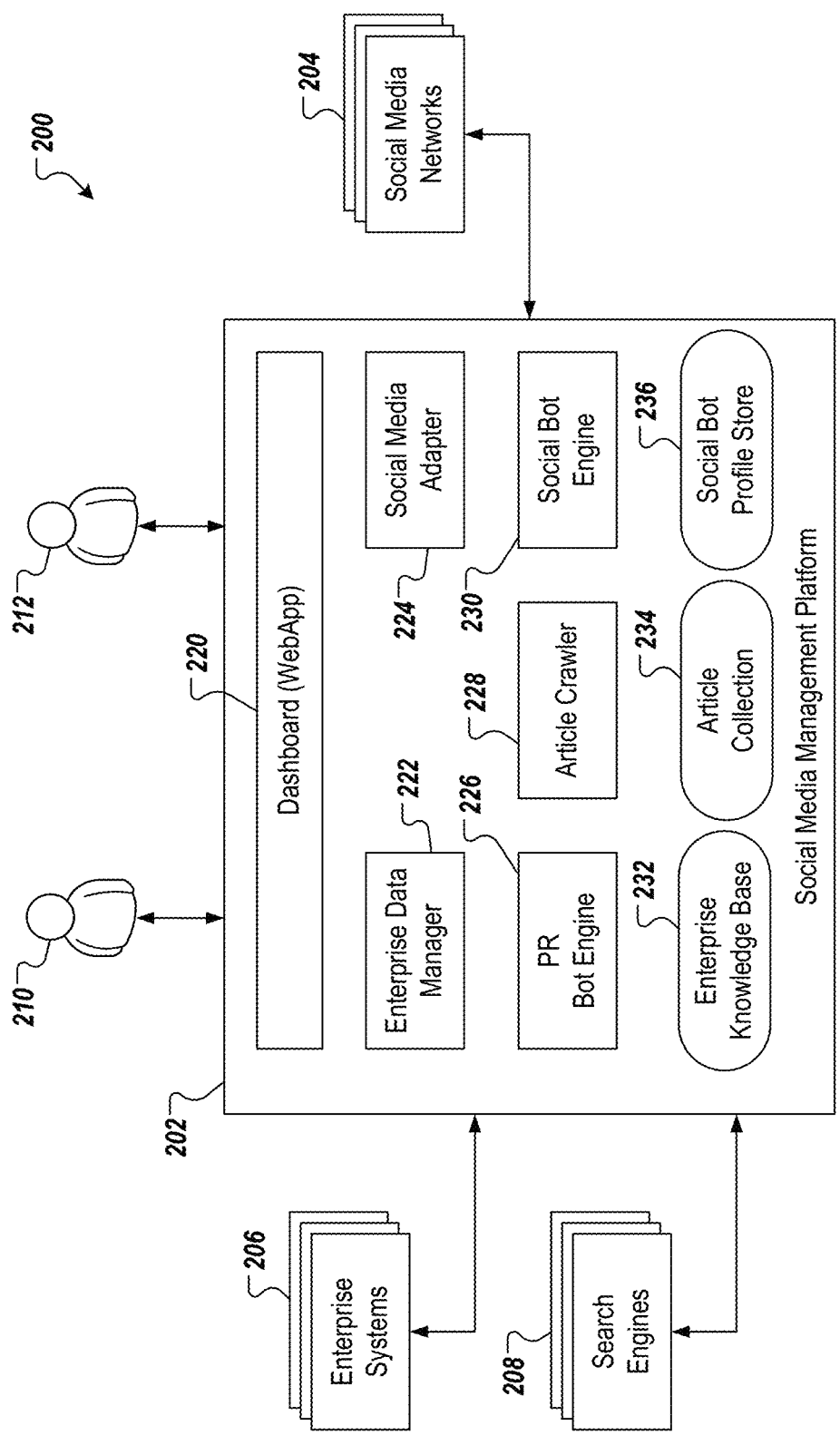
FIG. 2 depicts an example conceptual architecture for a social media management platform in accordance with implementations of the present disclosure.

FIG. 2 depicts an example conceptual architecture 200 in accordance with implementations of the present disclosure. In the depicted example, example conceptual architecture 200 includes a social media management platform 202, a set of social media networks 204, a set of enterprise systems 206, and a set of search engines 208. As depicted in FIG. 2, users 210, 212 can interact with the social media management platform. Each of the users 210, 212 represent user roles, as described in further detail herein. Although two users (user roles) are depicted, it is contemplated that any appropriate number of users can interact with the social media management platform 202. In some examples, each user 210, 212 interacts with the social media platform through a respective computing device (e.g., the client device 102 of FIG. 1).

In some examples, the user 210 is an agent of an enterprise that subscribes to the social media management platform 202 (e.g., to manage one or more accounts of the enterprise). As such, the user 210 can be responsible for inputting (or otherwise maintain data feeds) about enterprise entities (e.g., products, services, public-facing employees), as well as providing knowledge base items and properly link them to the respective entities. In some examples, the user 210 can act as an escalation point in instances when the social media management platform 202 determines autonomous action is inappropriate or unavailable for a particular scenario. In some examples, the user 212 is an agent of a provider of the social media management platform 202. As such, the user 212 can be responsible for creating autonomous social media bots as well as ensuring general operations of the social media management platform 202.

In the example of FIG. 2, the social media management platform 202 includes a dashboard 220 (e.g., provided as a web application (webapp)), an enterprise data manager 222, a social media adapter 224, a public relations (PR) bot engine 226, an article crawler 228, a social bot engine 230, an enterprise knowledge base 232, an article collection 234, and a social bot profile store 236.

In some implementations, the social media management platform 202 is designed to run on cloud infrastructures (e.g., SaaS landscape). As such, technical resources powering the social media management platform can be scaled up/down as needed. This also enables workflows to be run from a unique originating Internet computer identifier (i.e., IP address) that changes from one execution to the next. In some examples, the social media management platform has processes that are computationally intensive, highly parallel, and largely independent from one another. With these in mind, the social media management platform can be provisioned on cloud facilities supporting server-less architectures (e.g., AWS Lambda, Azure Functions).

In some examples, enterprises that subscribe to the social media management platform provide operational data. Example operational data includes, but is not limited to, data on the enterprise's entities (e.g., products, services, public-facing employees) to be placed within the purview of the social media management platform 202, and knowledge base articles (e.g., particularly articles that are available to the public) that the social media management platform 202 uses to provide recommendations and automated fact-checking. Operational data can be stored in the enterprise knowledge base 232 and the article collection 234. Enterprises enable the social media management platform access to their social media accounts.

The social media management platform 202 also makes use of the search engines 208, which can be publicly available search engines. For example, the social media management platform 202 uses search engines 208 for article lookup operations as well as to assist in generating automated responses. The social media management platform 202 crawls the web and maintain linkages to various publicly accessible articles and enterprise knowledge bases. In short, the social media management platform 202 has comprehensive links to various articles as well as maintaining an internal cache for those articles to be used in various matching and automated response operations, as described in further detail herein.

The social media management platform 202 output data mostly through the social media networks 204 (e.g., social media platforms such as Twitter, Facebook, LinkedIn, Stack Exchange, and others). In some examples, the social media management platform 202 controls different classes of accounts, namely, enterprise official social media accounts (e.g., managed by the PR bot engine 226), and independent social media accounts unrelated to any enterprise (e.g., managed by the social bot engine 230).

In some implementations, the provider of the social media management platform 202 creates and trains autonomous social bots as part of the on-going development efforts of the social media management platform 202. For example, machine learning (ML) engineers and data scientists of the provider create bots each with their respective profile, topics of interest, active time window, as well as creating their artificially generated profile photographs (e.g., using algorithms such as StyleGAN). To this end, each bot is trained with their respective unique datasets which appropriately represents their topics of interests, profile, language, and the like. Each social bot has a respective profile that is stored in and accessible from the social bot profile store 236. As described herein, the social bots run autonomously with minimum human intervention and can be managed by the social bot engine 230.

In further detail, a sphere of interest defined for each social bot dictates the datasets or ML models that are used to train the social bot. For example, a social bot related to food would be trained with data about food and be conversant on adjacent domains such as nutrition, restaurants, veganism, and the like. In contrast, another social bot can be trained for topics related to microprocessor technologies. In view of this, on-going development efforts include adding new autonomous bots in accordance to the domains of enterprises that are onboarded to the social media management platform 202. In other words, when an enterprise onboards to the social media management platform 202, available social bots are aligned with domains related to the enterprise and any absent social bots are created for the enterprise.

As introduced above, the social media management platform 202 maintains a collection of publicly accessible articles for use in fact checking, solution recommendation, and otherwise reinforce its reasoning in social media. In some examples, articles published by third parties can be used. In some examples, enterprises provide articles and declare them as authoritative for purposes of managing social media of that enterprise. An intake workflow can be provided that can include, for example, entering a public web link to the social media management platform 202 (e.g., through the dashboard 220), which points to an article in order to advocate its content. The social media management platform 202 fetches the linked content and processes the content. For example, natural language processing (NLP) and/or any other appropriate technique is used to extract keywords and topics from the content, match keywords and topis with entities of the enterprise, present matched entities for confirmation (e.g., to the user 210), receive confirmation and/or modifications as well as an indication of a category of the article, and store the article and metadata (e.g., category, matched entities/keywords/topics) in the article collection 234 for use in operations supporting that enterprise.

In some implementations, the social media management platform 202 functions as a first-responder, assuming a role as a member of each enterprise's social media team. For example, the social media management platform 202 autonomously operates social media account(s) of an enterprise along with agents of the enterprise. To this end, the enterprises configure the social media management platform 202 such that social media users external to the enterprise are unable to distinguish the social media management platform 202 from human agents of the social media team. In some examples, the enterprise can publicly identify automated social bots using nicknames designated by the enterprise. In general, first-responder activities can include handling an incoming message directed towards a social media account of the enterprise. Particularly those messages that are publicly visible. For instance, the @ExampleCorp mentions on Twitter directs the message to the social media account named "ExampleCorp" yet can be seen by all users of the social media network. By the same token, this flow also handles messages passed by the proactive engagement activity, which searches the social media network for posts that potentially requires responding, as described in further detail herein.

In further detail, the social media management platform 202 processes incoming messages through one or more ML models that classify the message into a message class. Example message classes can include, without limitation, a question class, a complaint class, a compliment class, a statement class, and an unknown class. The activities following receipt of the message are dependent on the class assigned to the message. In some examples, activities executed by either a PR bot (e.g., executed by the PR bot engine 226) or a social bot (e.g., executed by the social bot engine 230) depend on the class. All processing in this classification workflow are single-shot operations. Generally, each sub-activity processes one message at a time with no indeterminate iterations. Indeed, this is appropriate in a server-less architecture and would be scalable for any workload.

FIGS. 3A-6D depict example processes that can be executed in accordance with implementations of the present disclosure. In some examples, the example processes are provided using one or more computer-executable programs executed by one or more computing devices.

Figure 3A:
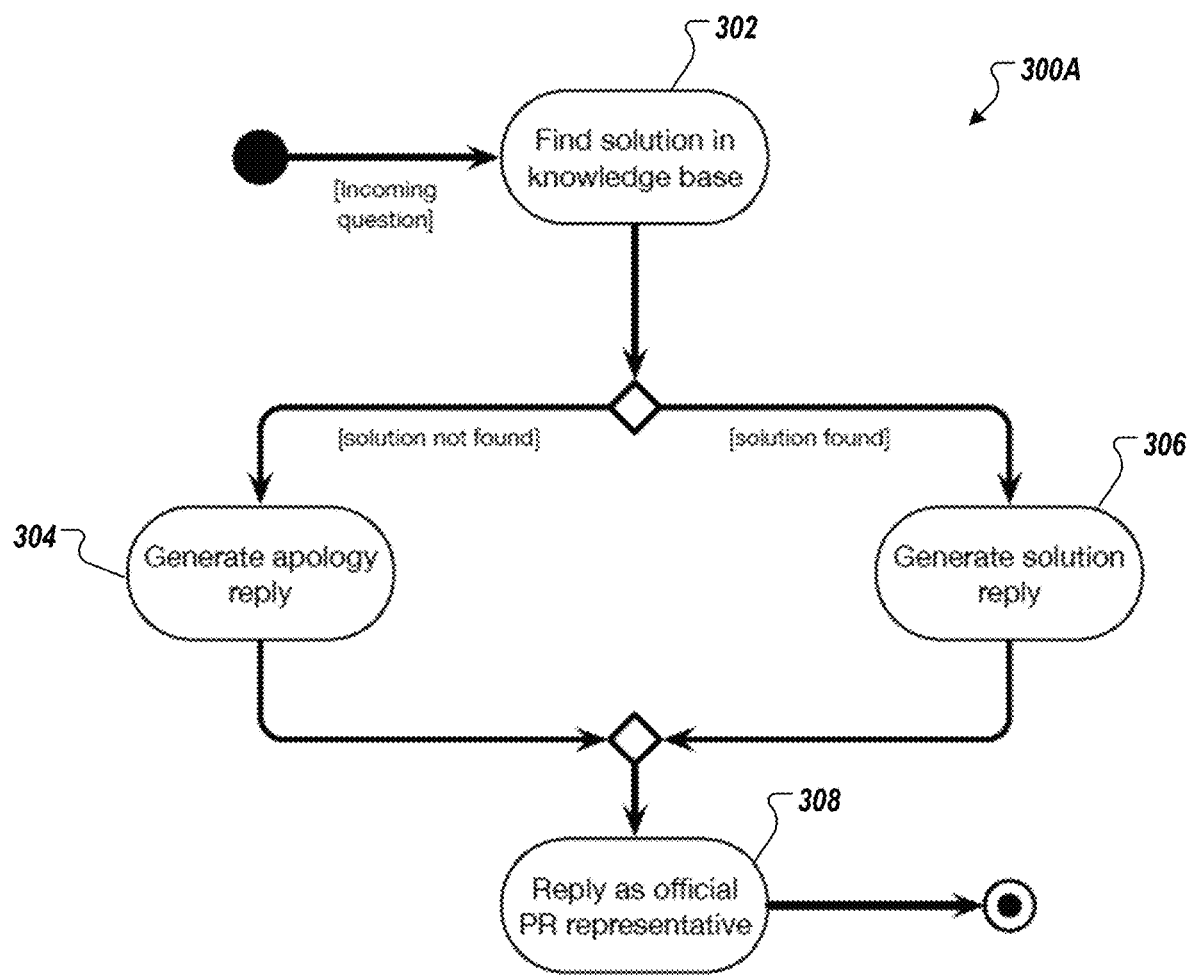
FIGS. 3A-6D depict example processes that can be executed in accordance with implementations of the present disclosure.

FIG. 3A depicts an example process 300A for incoming question handling. That is, in response to an incoming message being classified as a question, the process 300A of FIG. 3A is executed to handle the incoming message. As depicted in FIG. 3A, the knowledge base for the enterprise is queried (302) to determine whether a solution is available. If a solution is not available, an apology reply is generated (304) and a reply is sent (308) through the corresponding social media platform that the incoming message was received from. In some examples, an apology reply can be provided as a stock reply (e.g., I'm sorry, I can't answer that question, but I have directed your query to one of my colleagues). If a solution is available, a solution reply is generated (306) and a reply is sent (308) through the corresponding social media platform that the incoming message was received from. In some examples, a solution reply can be automatically generated from template text. Example template text can include "I think the solution you are looking for can be found here [URL]," where a HTTP link to a URL of a resource (e.g., article) can be inserted.

In some implementations, to determine whether a solution is available, the incoming message can be processed using one or more NLP techniques to determine one or more keywords and/or topics (e.g., product, service, and/or person implicated in the message). In some examples, metadata of the message (e.g., keyword, topic) is used to query the article collection 234. The system would use keyword search algorithms, such as TF/IDF or SAP's Service Ticket Intelligence product to find the relevant knowledge base articles for use in answering the question. Accordingly, solution replies can include a web link to resources and/or a support system of the enterprise. To this end, the link can create a ticket with as much data pre-populated as possible when the original poster clicks on it. Furthermore, replies can be generated using, for example, generative NLP algorithms (e.g., GPT-2) to provide a unique reply that appears to be written by a person.

Figure 3B:
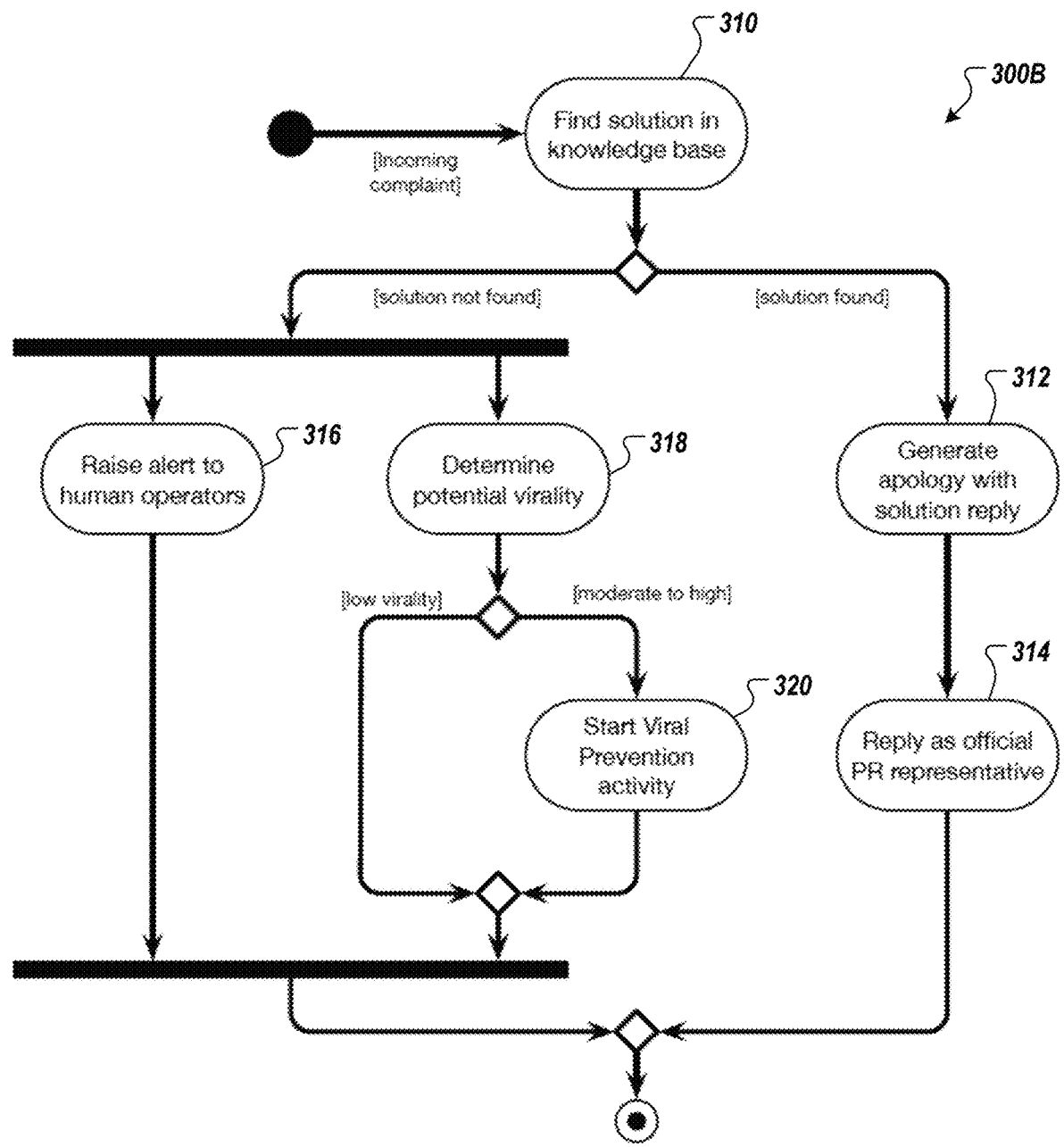

FIG. 3B depicts an example process 300B for incoming complaint handling. That is, in response to an incoming message being classified as a complaint, the process 300B of FIG. 3B is executed to handle the incoming message. As depicted in FIG. 3B, the knowledge base for the enterprise is queried (310) to determine whether a solution is available. If a solution is available, an apology-solution reply is generated (312) and a reply is sent (314) through the corresponding social media platform that the incoming message was received from. If a solution is not available, an alert is raised to one or more agents of the enterprise (316). In some examples, a potential virality of the complaint can be determined. If the potential virality is greater than a threshold virality, one or more viral prevention activities can be triggered (320). The one or more viral prevention activities can be executed by a social bot swarm to assist with mitigation in cases, such as the message being received outside of hours, and agents are not available to provide a timely response. Solutions can be identified and replies generated, as described above with reference to FIG. 3A. A potential virality of the incoming message can be determined using one or more virality prediction techniques that process the message using one or more ML models (e.g., a gradient boosted regression tree) to predict a potential virality of the message. An example is described in detail in Scalable Privacy-Compliant Virality Prediction on Twitter, Kowalczyk et al., Feb. 27, 2019, which is expressly incorporated herein by reference in the entirety.

In some implementations, the process to handle incoming compliments can include using the social media account of the enterprise to reply with an acknowledgment. Meanwhile in the background, the social media management platform can invoke the social bot swarm to provide affirmations for the original poster's message using message propagation activity, as described in further detail herein. In some examples, the acknowledgment is textually unique and somewhat conversationally relevant to the incoming message. Therefore, the original poster would feel that a true human representative of the client company composed the reply. To this end, the social media management platform can use generative NLP algorithms, such as GPT-2, to generate these "thank you" messages that are unique and natural.

Figure 3C:
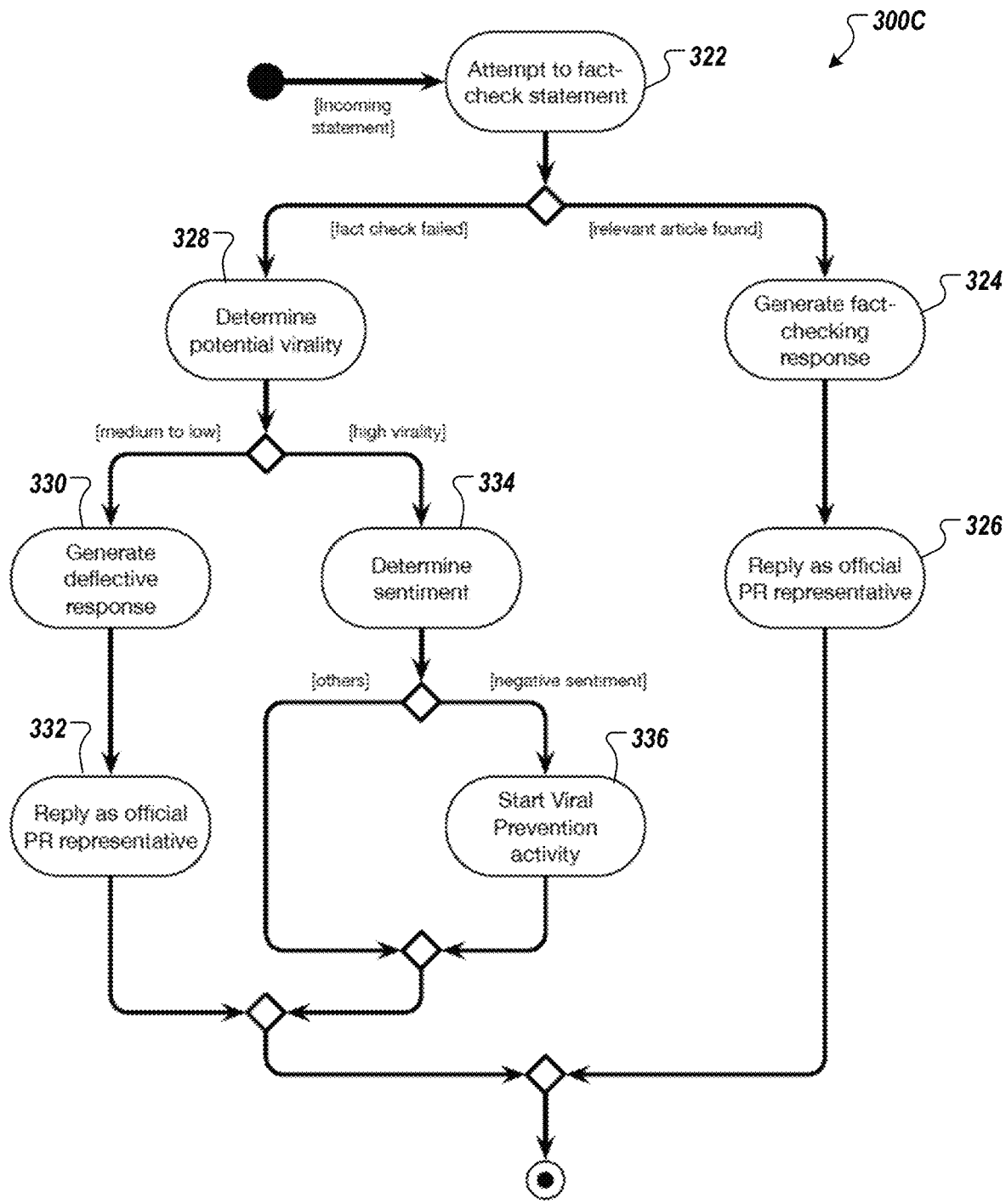

FIG. 3C depicts an example process 300C for incoming statement handling. That is, in response to an incoming message being classified as a statement, the process 300C of FIG. 3C is executed to handle the incoming message. As depicted in FIG. 3C, an attempt is made to fact-check the statement (322). For example, metadata determined for the message (e.g., topics/keywords) can be used to query the article collection to determine whether one or more articles that are authoritative on the statement are available. If one or more articles are identified, a fact-checking reply is generated (324) and a reply is sent (326) through the corresponding social media platform that the incoming message was received from. In some examples, the fact-checking reply provides an indication of agreement/disagreement with the message and provides one or more links to the article(s). In some examples, fact-check incoming statements can be performed using ML algorithms such as RoBERTa or VeriSci. RoBERTa is described in RoBERTa: A Robustly Optimized BERT Pretraining Approach, Liu et al., Jul. 26, 2019, and VeriSci is described in Fact or Fiction: Verifying Scientific Claims, Wadden et al., Oct. 3, 2020, each of which is expressly incorporate herein by reference in their entireties. By providing an article registered in the enterprise content registration activity, the argument of the fact-checking response is strengthened. In turn, articles can also be sourced from the public knowledge bases or an approved third-party content (e.g., registering a web article also constitutes an act of approving it for the purpose of fact checking).

If an article is not available, a potential virality of the statement is determined (328). If the potential virality does not meet a virality threshold, a deflective response is generated (330) and a reply is transmitted (332). A deflective response can be described as a social media reply that serves to acknowledge the original poster and show that the enterprise is responsive, yet does not provide any new information. A deflective response can be provided using generative NLP models, such as GPT-2, that are trained towards politically correct yet non-committal responses. If the potential virality meets the virality threshold, a sentiment is determined (334) and, if negative, one or more viral prevention activities can be triggered (336). The one or more viral prevention activities can be executed by a social bot swarm to assist with mitigation. On the whole, the social media management platform would mitigate viral content having negative sentiment. Since positive statements may help the enterprise, mitigation is not needed. In order to make this decision, the social media management platform would use sentiment analysis models such as VADER, language-specific BERT models, and/or even SAP's Service Ticket Intelligence product. VADER is described in VADER: A Parsimonious Rule-based Model for Sentiment Analysis of Social Media Text, Hutto et al., 2014, and example BERT models are described in A Survey on Sentiment Analysis and Opinion Mining in Greek Social Media, Alexandridis et al., 2021, each of which is expressly incorporate herein by reference in their entireties.

Figure 3D:
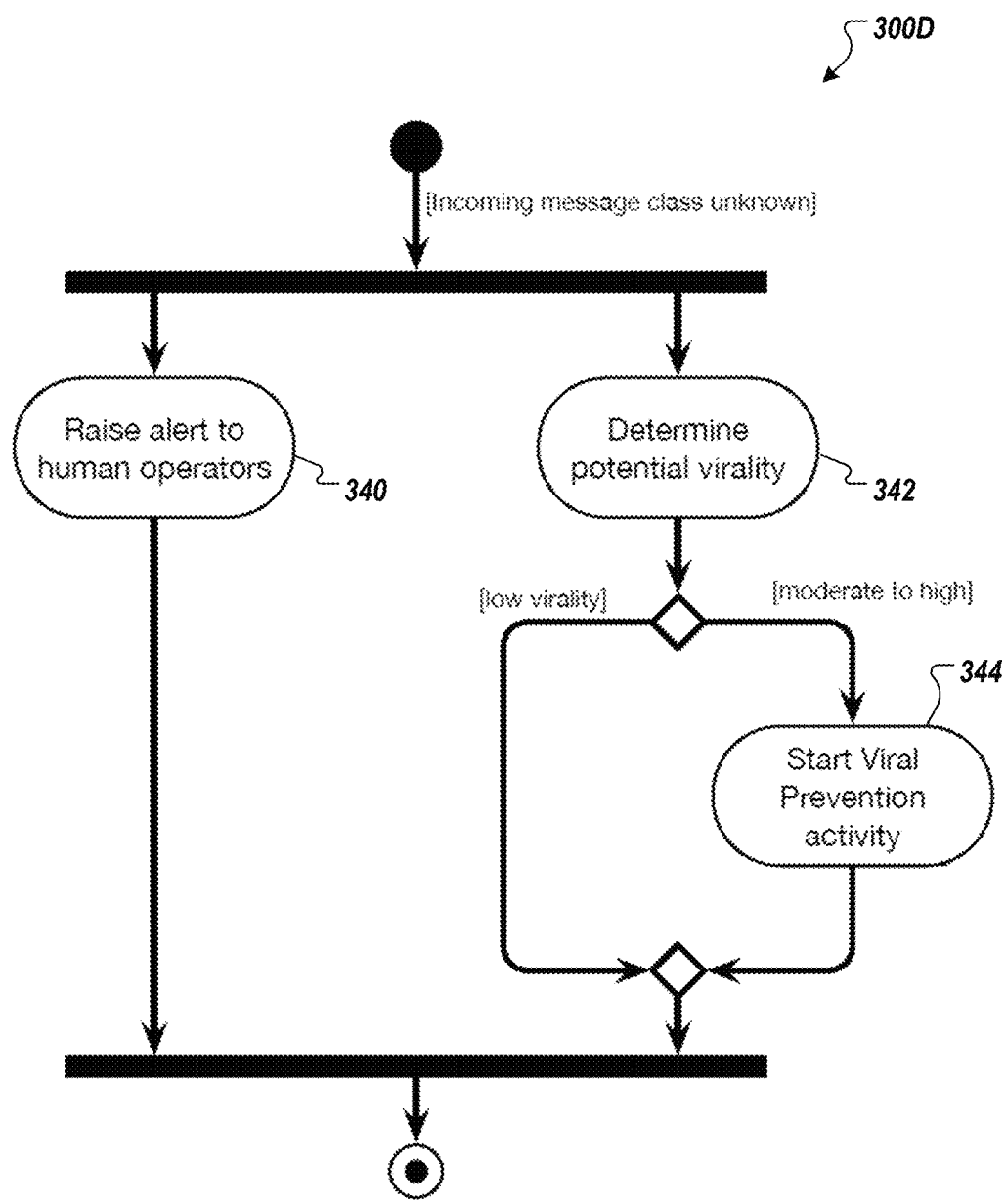

FIG. 3D depicts an example process 300D for handling incoming messages of unknown class. That is, in response to an incoming message being classified as an unknown, the process 300D of FIG. 3D is executed to handle the incoming message. As depicted in FIG. 3D, an alert is raised to one or more agents of the enterprise (340). In some examples, a potential virality of the message can be determined (342). If the potential virality is greater than a threshold virality, one or more viral prevention activities can be triggered (344). The one or more viral prevention activities can be executed by a social bot swarm to assist with mitigation in cases, such as the message being received outside of hours, and agents are not available to provide a timely response.

In some implementations, the social media management platform periodically searches social media networks for posts that may be relevant for any enterprise that is subscribed. Accordingly, the social media management platform attempts to proactively discover posts that are relevant to enterprises and invoke the first-responder activity to enterprises. Unlike the first-responder activities (e.g., activities discussed with reference to FIGS. 3A-3D) this flow processes posts that are not specifically directed to a social media account of enterprises. In effect, this proactive engagement would portray enterprises as proactive in the respective social media networks.

Figure 4:
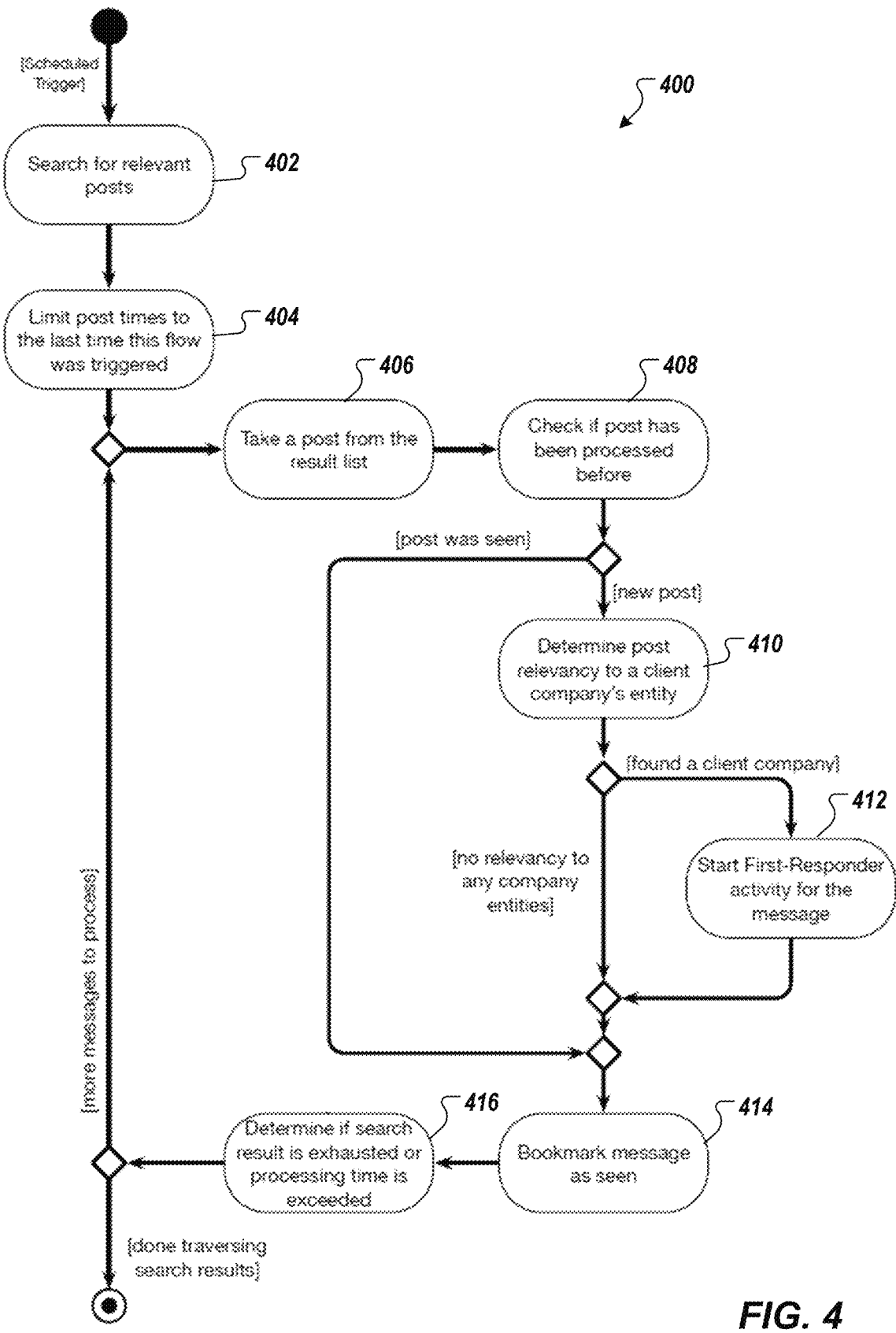

FIG. 4 depicts an example process 400 for proactive engagement. As depicted in FIG. 4, a search is performed for relevant posts (402) and search results can be limited to posts having timestamps that are later than a last time a search was conducted (404). In some examples, for each enterprise, the social media management platform uses keywords/topics relevant to entities (i.e., products, services, people) and inputs queries to search functions of respective social media networks and/or search engines to find recent posts. In some implementations, the social media management platform can use Named-Entity Recognition (NER) techniques to associate a post coming from search results with a particular entities based on the entities detected in the respective post. Some of the algorithms that the system can use for NER includes BERT with Dice Loss, biLSTM-CRF, and/or SAP's Business Entity Recognition product. BERT with Dice Loss is described in Dice Loss for Data-imbalanced NLP Tasks, Li et al., Aug. 29, 2020, and biLSTM-CRF is described in Deep Contextualized Word Representations, Peters et al., Mar. 22, 2018, each of which is expressly incorporate herein by reference in their entireties.

In response to identifying relevant posts, for each post, the social media management platform asynchronously invokes first-responder activity for the post. In other words, the message would be as if it was directed directly to the social media account of the respective enterprise by the poster. For example, for each post (406), it is determined whether the post has been previously processed (408). If the post has not been previously processed, a relevancy of the post to any enterprise (410) is determined. For example, keywords/topics determined for the post can be compared to keywords/topics of each enterprise and, if there is sufficient overlap, the post can be determined to be relevant. If the post is relevant to an enterprise, one or more first-responder activities are executed on the post (412). That is, for example, the post can be treated as an incoming message to the enterprise, can be classified, and handled appropriately (e.g., executing activities of one or more of FIGS. 3A-3D). This can be performed for each enterprise that the post is determined to be relevant to. The post is bookmarked as having been handled (414). For example, the post can be logged to avoid re-processing the post in a future search. It is determined if the search results have been exhausted or a processing time has been exceeded (416).

In some implementations, the autonomous social bots of the social media management platform execute independent activities (e.g., when not engaged as part of a swarm). In some examples, the social bots generate respective social media content in order to emulate human agents in their use of social media networks. Consequently, each social bot has storage space, a social media account, and supporting ML models. As introduced above, the social bots can be individually created, trained, and configured, which includes configuring domain(s) of interest. Further, a profile picture for each social bot can be created using synthetic photo creation tools (e.g., StyleGAN).

In some implementations, each social media bot is periodically invoked, where each invocation is expected only to last a few minutes as a stateless service process. Consequently, hardware resources would be allocated and torn down as needed as part of its server-less architecture. Here, the server-less architecture would help ensure that each social bot would likely be run from a different Internet location (i.e., IP address) to reduce a likelihood of service being denied to the social bots. In some examples, each social bot can be run multiple times per day. Similarly, a social bot can be associated with active hours, during which the social bot engages on social media.

When triggered as part of normal content creation flow, a social bot can be randomly assigned a mode to operate in. Example modes include connection discovery, connection interaction, article discovery, article publishing, and opinion publishing. In connection discovery, the social bot searches for other social media users having similar interests in order to make an initial contact. In connection interaction, the social bot deepens connections with existing contacts by interacting with those other social media accounts. In article discovery, the social bot searches the web for articles matching its interests to be saved for later use. In article publishing, the social bot publishes a commentary of an article. In opinion publishing, the social bot posts a summary opinion of recent events derived from its collection of articles.

Figure 5A:
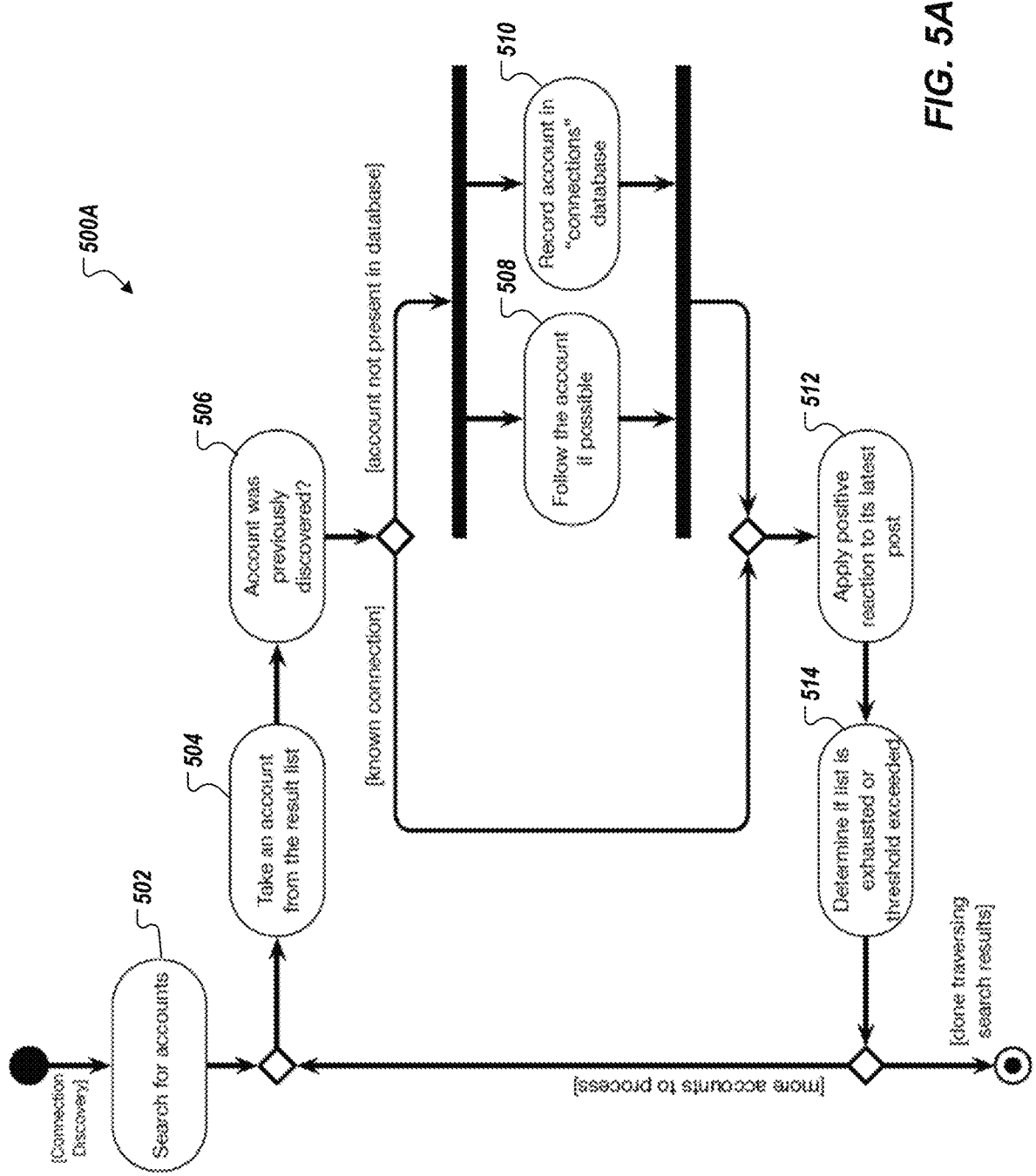

FIG. 5A depicts an example process 500A for connection discovery. That is, in response to being assigned the connection discovery mode, the process 500A of FIG. 5A is executed. In the connection discovery workflow (e.g., the process 500A of FIG. 5A), the social bot lookups other users within the social media network and make first contact. In some examples, the social bot uses search functionality of a respective social media network for other accounts that produce content matching to the configured interests of the social bot. In some examples, the social bot informs its interest to the other account without producing pronouncement. For example, the social bot can use features of follow, favorite, upvote, share, retweet, and the like.

With particular reference to FIG. 5A, an account search is executed (502) to search for accounts that might be relevant to the interest(s) of the social bot. In some examples, keywords/topics of the interest(s) of the search bot are used in queries to determine search results including accounts that are relevant. In some examples, for each account (504), it is determined whether the account has been previously processed (506). For example, the social bot can compare data representative of the account with a database of accounts that the social bot already has connections with. If the account has been previously processed, the social bot can follow the account (508) and/or record publicly visible connections of the account within the social media platform. The social bot applies a positive reactions to a most-recent post of the account (512). It is determined if the search results have been exhausted or a processing time has been exceeded (514).

Figure 5B:
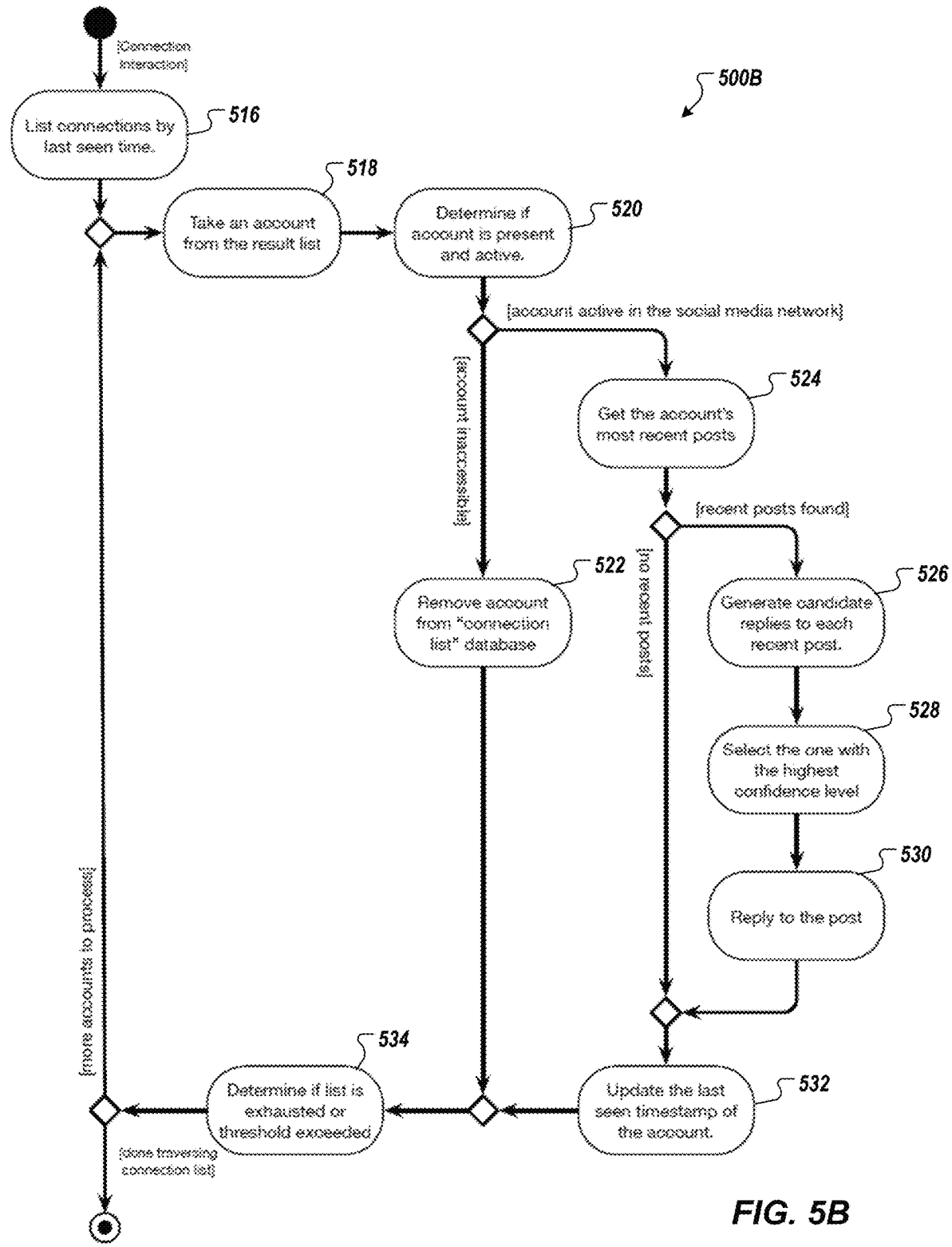

FIG. 5B depicts an example process 500B for connection interaction. That is, in response to being assigned the connection interaction mode, the process 500B of FIG. 5B is executed. In the connection interaction mode, a social bot selects a set of connections and engages with them. In some examples, the social bot prunes its collection of inactive accounts (e.g., inactive of deleted accounts). In general, the social bot would select a set of accounts that it has not interacted with within a predetermined period of time (e.g., last week, last month) and initiate a conversation. In some examples, the social bot samples posts made by each account and generates replies. The social bot can use generative ML models (e.g., long short-term memory (LSTM)) trained by samples of pre-existing conversations in the targeted social media. For example pre-existing conversations in the social media network can be extracted used as a dataset to train ML models, which social bots use to engage with other users in idle conversations.

With particular reference to FIG. 5B, a set of connections is determined based on last-seen times (516). For example, for each account in a set of accounts that the social bot is connected with, a last-seen time (e.g., last time the social bot interacted with the account) can be compared to a threshold time. If the last-seen time is earlier than the threshold time, the account is included in the set of connections. In some examples, for each account in the set of connections (518), it is determined whether the account is active (520). For example, a timestamp of a most-recent post of the account can be compared to a threshold timestamp, and, if the most-recent post is later than the threshold timestamp, the account can be determined to be active. If the account is not active, the account is removed as a connection of the social bot.

If the account is active, a set of posts of the account is obtained (524). In some examples, the set of posts include posts that were posted within a threshold time of a current time. If the set of posts is not empty, for each post, a set of candidate replies is generated and is associated with a confidence level (526). For each post, the candidate reply having the highest confidence level is selected (528) and is used to reply to the post (530). A last-seen timestamp for each account is updated (532). It is determined if the search results have been exhausted or a processing time has been exceeded (534).

In some implementations, candidate replies are generated by a social bot using generative seq2seq ML models engineered to create conversations. Examples of this are discussed in further detail in Generative Chatbots using the seq2seq Model, Shav, Towards Data Science (2020), which is incorporated herein by reference in the entirety. In general, seq2seq ML models predict the next series of words based on user input. Similarly, these generated word sequences can be fed again to the same ML model instance as input to write the next sequence of words. Hence a sliding window of word sequences can generate an infinite amount of text. In accordance with implementations of the present disclosure, each post is used as a seed for the seq2seq ML model to generate a corresponding reply. In turn, the social bot would limit the generated responses up to the typical length of posts in the social network (e.g., 160 characters for Twitter).

In further detail, each social bot includes a unique generative seq2seq ML model instance. Because each social bot is engineered around a persona, it follows that the social bot would have a certain domain of expertise as well as interests. Consequently, its generative conversational ML model would be trained using data relevant to that domain and/or set of interests. For example, a social bot having interests in stock trading would have its conversational ML model trained with data sourced from social media interactions about markets (e.g., Reddit's Wall Street Bets, Stack Exchange Money). In contrast, conversational ML models trained using generic data (e.g., Stanford Question Answering Dataset (SQuAD)) can only provide very generic replies and would be easily detected as coming from a bot.

With regard to confidence level, each candidate reply generated by a seq2seq ML model is output with a confidence level (e.g., a floating-point number between 0 . . . 1, ranging from no confidence to complete confidence) that is determined by the ML model. For example, the confidence level can be determined from posterior probabilities as well as training similarity. In another approach, a candidate reply can itself be processed through a confidence level ML model for Automated Turing Test, such as the ADEM algorithm discussed in further detail in Towards an Automatic Turing Test: Learning to Evaluate Dialogue Responses, Lowe et al. (2017), which is expressly incorporated herein by reference. In essence, these confidence level checks are done as sanity tests to protect against non sequitur responses. In other words, the social bot selects the best response, as measured by confidence score, such that the social bot creates a conversation and avoids being recognized as a bot.

Figure 5C:
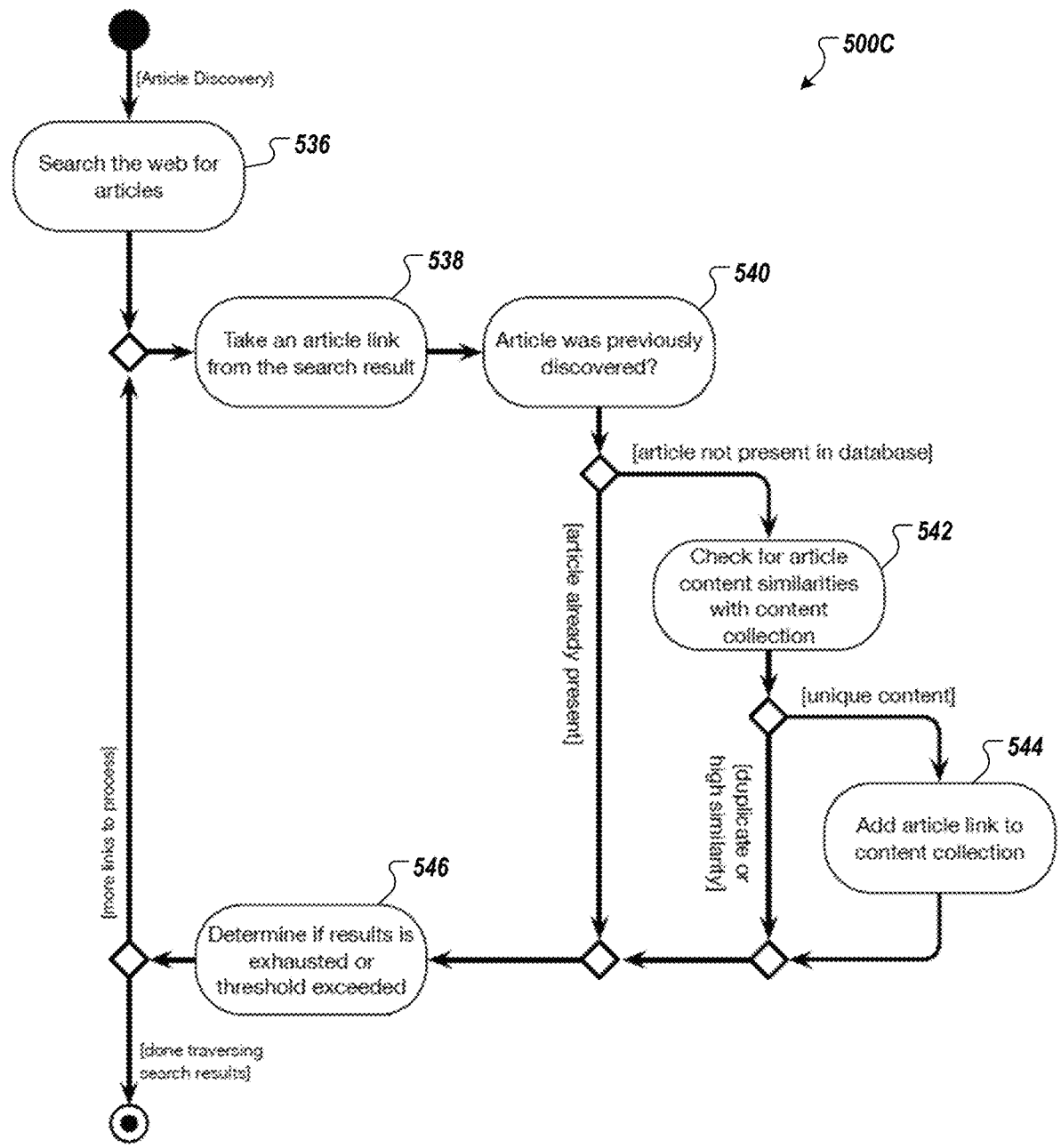

FIG. 5C depicts an example process 500C for article discovery. That is, in response to being assigned the article discovery mode, the process 500C of FIG. 5C is executed. In the article discovery mode, the social bot searches the web for recent articles matching its interests. Accordingly, the bot would save these articles in its collection to serve as sources for the social bot to make commentaries on recent events within the sphere of interests of the social bot. In some examples, the social bot posts discovered commentaries during a run cycle. In some examples, the social bot uses language processing techniques, such as TF/IDF, to determine article similarity. Because news articles within a time span tend to duplicate each other, due to covering the same or similar topics, the social bot ensures a measure of diversity within its own article collection. For example, the social bot can use article similarity algorithms to de-duplicate content retrieved from the web. In other words, the social bot would avoid storing the same article twice (despite having distinct Internet addresses or URLs) or stocking two articles covering the same event. Similar other run modes of the social bot can include internally posing a limit of how many articles processed within a cycle or how long it would process such articles. Consequently, the limit avoids throttling by search engines or news sites.

With particular reference to FIG. 5C, a search is performed to discover articles (536). For each article in a set of articles (538), it is determined whether the article was previously discovered (540). For example, the URL of the article can be compared to a database of URLs of discovered articles. If the article has not been discovered before, content of the article is compared to content of articles stored within a content collection (542). For example, techniques such as TF/IDF is performed on content of the collection and content of the article, to make comparisons for similarity. If content of the discovered article is sufficiently dissimilar to content of articles already included in the collection, the article is added to the collections (544). It is determined if the search results have been exhausted or a processing time has been exceeded (546).

Figure 5D:
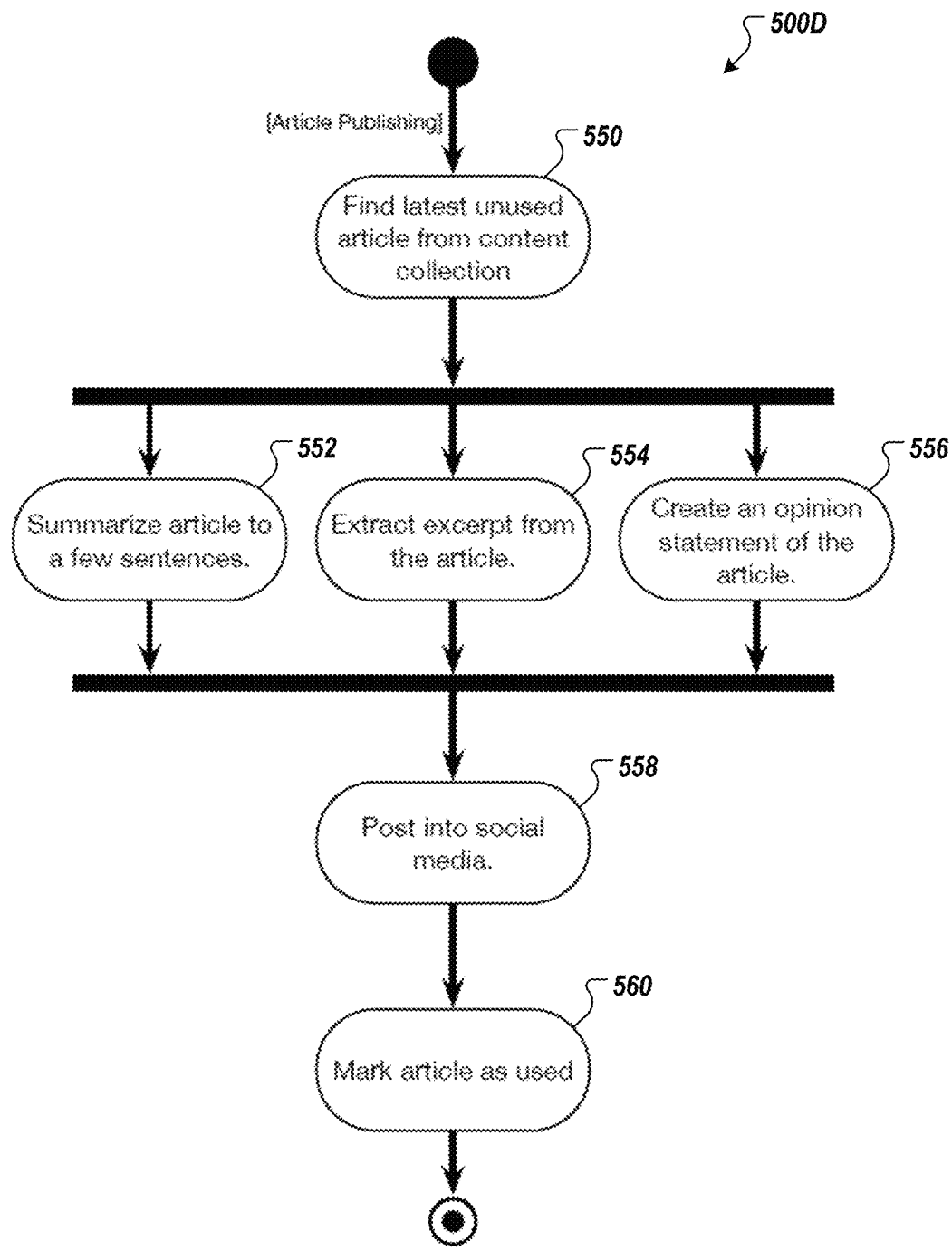

FIG. 5D depicts an example process 500D for article publishing. That is, in response to being assigned the article publishing mode, the process 500D of FIG. 5D is executed. In the article publishing mode, the social bot publishes a social media post derived from its accumulated articles. In some examples, the social bot selects an article to create an excerpt as well as a summary of the article to post with a link to the original article to create content as well as acquiring some authority on the topic. In some examples, the social bot use deep-learning text summarization algorithms, such as pointer-generator networks to generate article summaries. Example pointer-generator networks are described in Get To The Point: Summarization with Pointer-Generator Networks, See at al., 2017, which is expressly incorporated herein by reference in the entirety. In some examples, the social bot uses autoregressive NLP algorithms such as GPT-2, to create an opinion statement on the article. In some examples, the social bot extracts one or more statements from the article as an excerpt using, for example, the TextRank algorithm, which is described in TextRank: Bringing Order into Text, Mihalcea et al., 2004, which is expressly incorporated herein by reference in the entirety. In some examples, if the amount of text of a post is limited, the social bot can prioritize posting the article link, opinion statement, generated summary, and extracted excerpt—in that order— to populate the social media post. In some examples, article publishing activity is a one-shot process without an internal loop that only creates a maximum of one post on each run. In this manner, the posting activities of the social bot to the social media network is throttled in order to avoid being seen as spamming.

With particular reference to FIG. 5D, a most-recent, un-posted article is determined from the content collection (550). A summary is generated (554), an excerpt is extracted (554), and an opinion statement is generated (556). A post is constructed to include one or more of the summary, the excerpt, and the opinion statement and is posted to a social media platform (558). The article is marked as posted in the content collection (560).

Figure 5E:
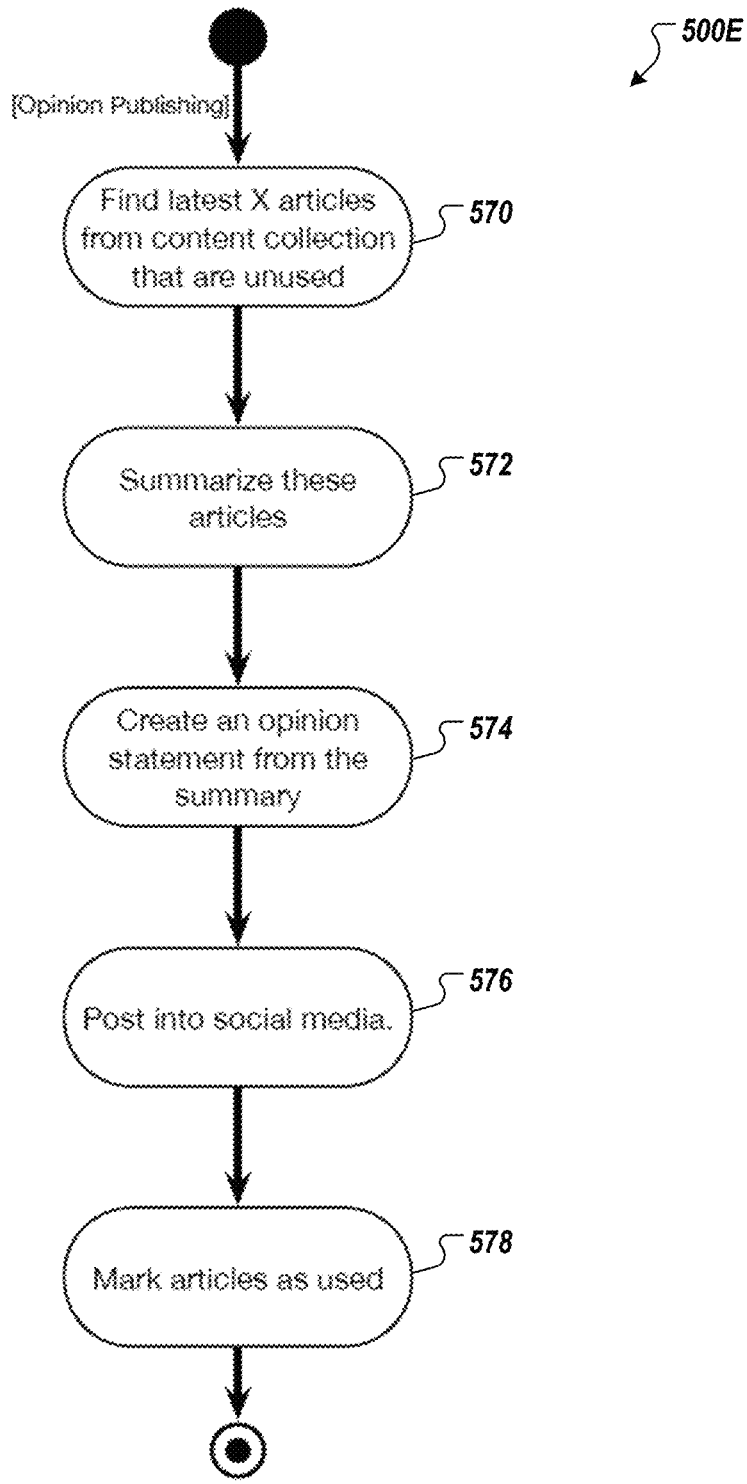

FIG. 5E depicts an example process 500E for opinion publishing. That is, in response to being assigned the opinion publishing mode, the process 500E of FIG. 5E is executed. In the opinion publishing mode, the social bot posts an opinion about the latest trends within its sphere of interests. In particular, the social bot would take two or more latest articles (by their respective original publishing dates, if available), amalgamate the articles into a single body, and provide an opinion about the combined content. In some examples, the social bot executes generative NLP algorithms, such as GPT-2, to generate the opinions. In some examples, opinion publishing activity is a one-shot process without an internal loop that only creates a maximum of one opinion on each run. In this manner, the posting activities of the social bot to the social media network is throttled in order to avoid being seen as spamming.

With particular reference to FIG. 5E, a set of articles is determined from the content collection (570). In some examples, the set of articles includes articles that have not been used in generating opinions. The articles are processed to provide a summary (572) and an opinion statement is created based on the summary (574). The opinion is posted to the social media platform (576) and the articles are marked as used within the content collection (578).

As introduced above, the social media management platform of the present disclosure executes social bot swarm mobilization activities. For example, the social media management platform maintains a pool of social media accounts that are unrelated to any enterprise. Each autonomous social bot can operate each of the social media accounts, generally independent of one another. In some instances, the social bots run to create their own content (e.g., as described herein with respect to social bot content creation activities) in order to garner reputation for their respective social media accounts. In some instances, the social media management platform calls upon some of the social bots as part of a swarm to attenuate an undesired social media post or otherwise amplify a positive message about an enterprise. To this end, a swarm of social bots can be used to apply social pressure to mitigate undesired posts from achieving critical mass (e.g., prevent virality) and/or to provide support, social approval, and encouragement for desired posts.

In some implementations, each social bot swarm mobilization activity is divided into steps. In a first step, the social media management platform constructs a swarm of social bots by selecting social bots appropriate for the post at hand. In a second step, each social bot in the swarm independently executes either the negative social pressure activity or the positive social encouragement activity, depending on whether the social media management platform decides to prevent a message from becoming viral or to encourage a message to spread. In the social bot selection steps, the social media management platform constructs a swarm by selecting social bots with social media accounts that have achieved certain reputation. Accordingly, newly created bots would not be included as part of the swarm. Furthermore, the social media management platform only consider those social bots having interests that are somewhat relevant with the post that is being targeted. For example, if the post is relevant to food, then the social media management platform would only select social bots having food configured as one of its topics of interests as well as having posted content related to food, restaurants, and other adjacent topics.

With regard to reputation, the provider of the social media management platform can run automated social bot detection tools on its own social bot accounts to determine the reputability of each account. For example, when state-of-the-art ML models are unable to confidently conclude that an account is a social bot, then the social bot is considered reputable enough to mobilize. Otherwise, the social bot would stay in a content-creation mode until its content would be indistinguishable enough to a human social media user. Bot detection through ML models typically uses supervised machine learning in which algorithms are trained to differentiate between a bot or human by looking at a large number of features in the training data. Furthermore, those features typically consist of data derived from the content (i.e., actual social media posts) as well as account metadata (activity times, social graph, etc.). Therefore, the more content and connections that the social bot is able to accumulate, the better chance it could be seen as a human user, hence being reputable.

In some examples, the social media management platform would provide each selected bot with information on the target post, which can include the identity of the enterprise targeted by the post. The social media management platform schedules each social bot to execute its corresponding social pressure or social encouragement activity in its next available time window. In this manner, the social media network that the target post is in will not see this activity as out of the ordinary from the normal flow of activities of the social media account. Each social bot in the swarm would produce at most one action for each invocation of the flow. In this manner, an internal throttling mechanism is provided to prevent the social media network from seeing too many actions coming from an account and deny service to it. These activities would also benefit when implemented in a serverless architecture. Namely each social bot in the swarm should get its own originating machine identifier (i.e., IP address) as part of their respective lambda function execution environment. As a result, the social media network would be unable to effectively recognize the presence of a coordinated swarm.

Figure 6A:
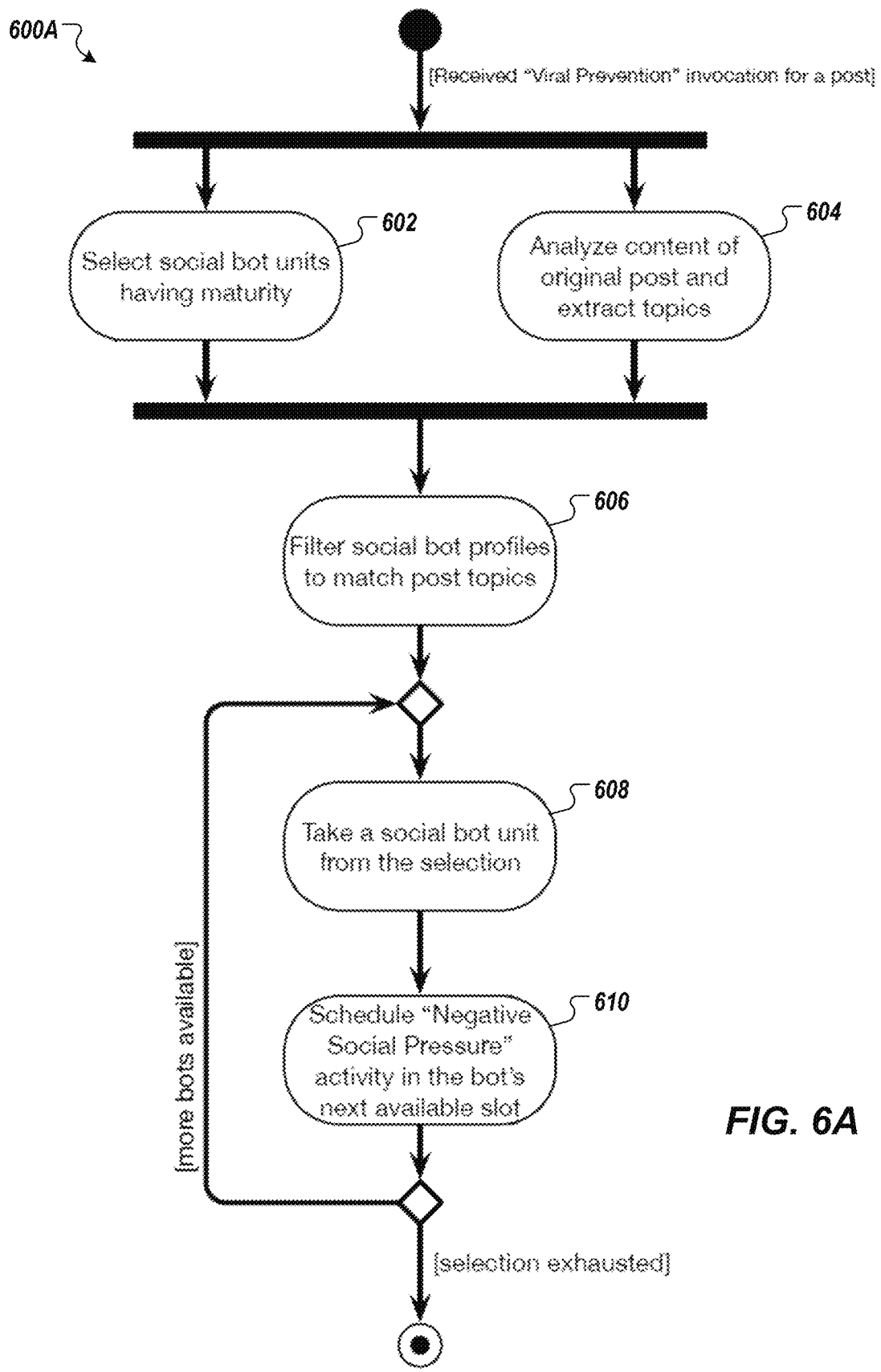

FIG. 6A depicts an example process 600A for viral prevention. In viral prevention, the social bot swarm attempts mitigation to prevent a social media post from achieving critical mass (i.e., prevent the post from going viral). The social media management platform achieves this by coordinating a deluge of social media accounts to express disapproval to the post, which can be described as a social media equivalent of discouragement through peer pressure. Because those disapproving social media accounts are unrelated to any enterprise (nor the social media management platform itself), the enterprises are not involved in the mitigation campaign. Some social media platforms have built-in mechanisms that hide, or otherwise mitigate the spread of posts having an increasing number is disapprovals. Accordingly, disapprovals coming from a significant number of users would be able to mute unwanted posts in these social media platforms.

With particular reference to FIG. 6A, it can be determined that a post having a negative sentiment has a potential virality that meets a threshold virality (e.g., as discussed above). In response, a set of social bots is selected (602) and content of the target post is analyzed and topics extracted (604). In some examples, the set of social bots includes social bots that are of a sufficient maturity. Social bots in the set of social bots are filtered to provide a sub-set of social bots (606). In some examples, social bots not having interests that match the interests of the target post are filtered. A social bot is selected from the sub-set of social bots (608) and a negative social pressure activity is scheduled for the social bot in a next timeslot that the social bottom is scheduled to be active (610). This iterates over all social bots in the sub-set of social bots.

Figures 1, 6B:
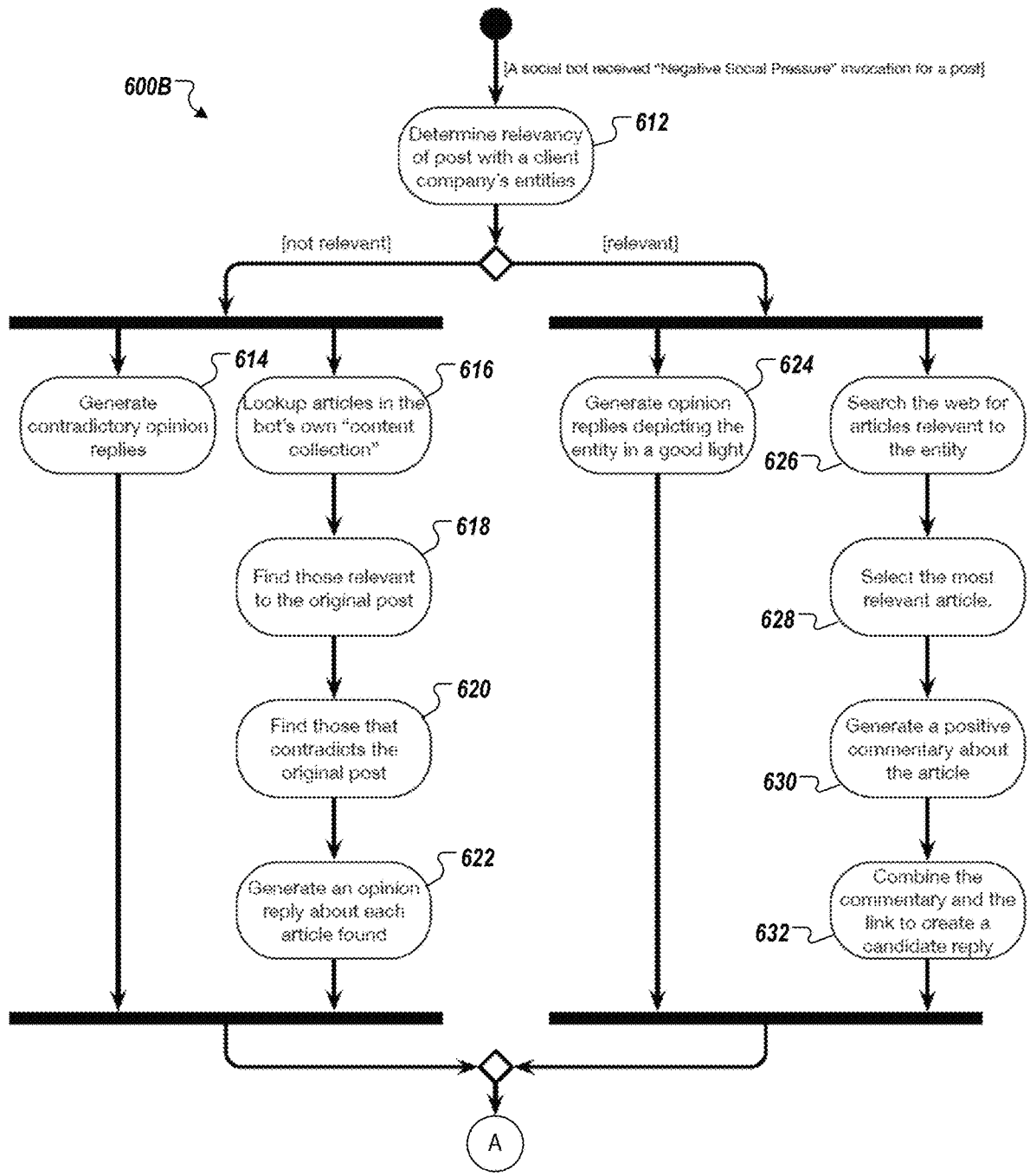
Figures 2, 6B:
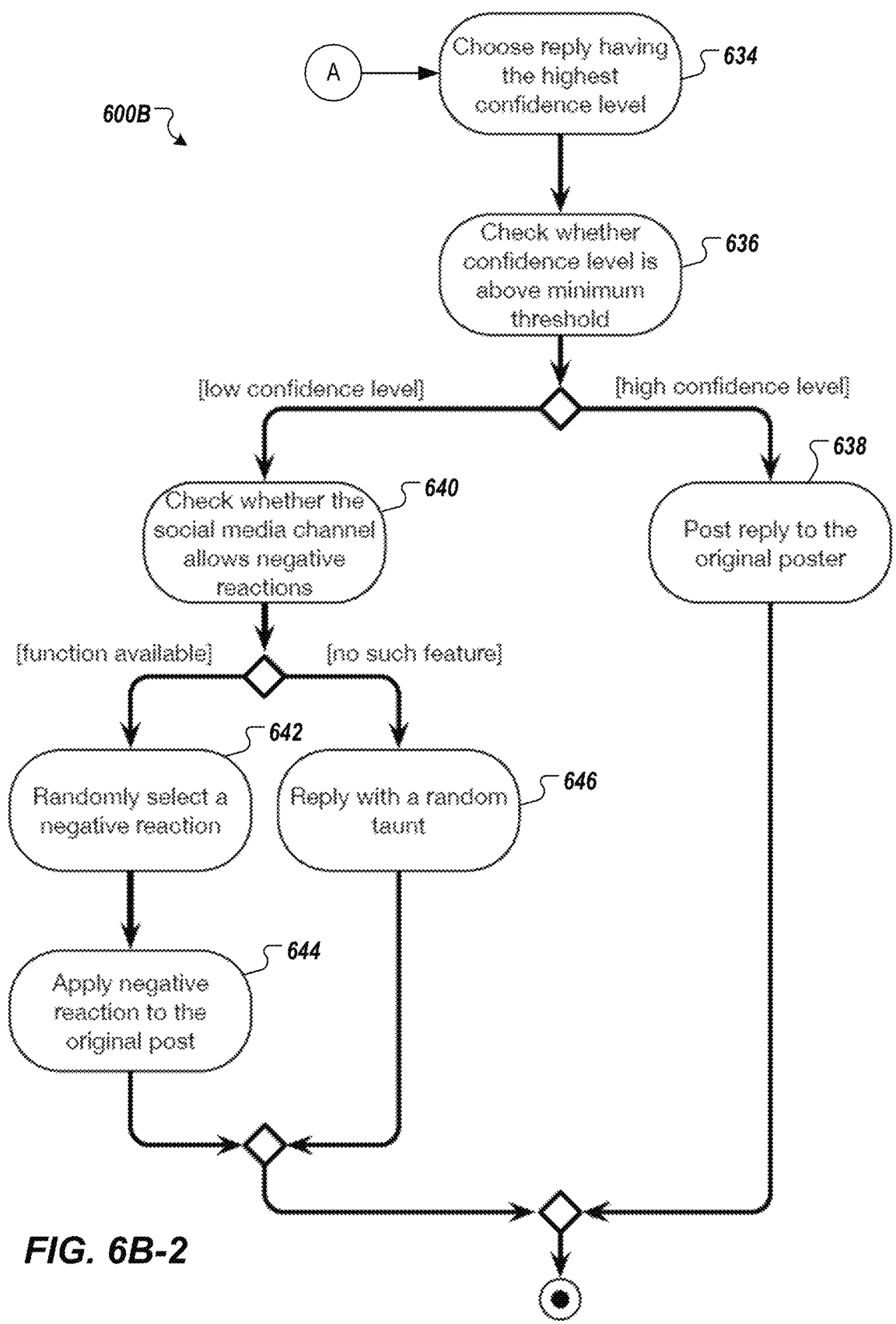

FIG. 6B depicts an example process 600B for negative social pressure. In negative social pressure, negative social pressure activity is a single-shot flow scheduled alongside the normal content creation activities of the social bot within its usual active time window. The social bot starts the flow by attempting to associate the post with an entity of the enterprise (e.g., products, services, public-facing employees). If the social bot identifies an entity with high confidence, the social bot uses keywords/topics associated with the entity to initiate web searches for articles relevant to the entity. Likewise, the social bot filters the web search results further by using its own internal algorithms and selects the most relevant article to the entity. The social bot generates a commentary of the article and creates a candidate reply with a link to that article. The social bot can use NER techniques to associate a post's relevancy with entities. That is, to match the entities discovered in the post with the entities that the enterprise has and select the best matching result. Furthermore, further filtering of web search results can be done using TF/IDF algorithms combined with NER techniques. In some examples, the social bot ranks the keywords in articles returned by web search to match the keywords belonging to the selected entity of the enterprise. Similarly, the NER techniques would help in detecting entities in the article and correlating those entities with sub-entities or entities adjacent to the selected client company. The social bot combines all of these ranking methods to choose an article to use as a base to generate a positive commentary.

In some examples, when the bot is unable to associate the post with an entity of an enterprise, the social bot chooses alternative options of creating contradictory replies. To this end, the social bot generates candidate replies with the help of its own article collection and as well as without it. All of these candidate messages would be formatted in such a way that it forms naturally sounding replies to the original poster's message. Having a number of candidate replies, the social bot selects the candidate reply having the highest confidence level and post this as a reply to the target post. The social bot would only choose this path should the quality of the generated reply be high enough to warrant posting.

Should none of the candidate replies meet the desired quality metrics, the bot can resort to a random negative reaction. If the social media network at hand supports a simple negative reaction (e.g., downvote, dislike), then the social bot would choose that instead. Otherwise, the social bot would resort to generating a random reply. In some examples, the social bot uses generative NLP algorithms, such as GPT-2, to generate replies and commentaries. It would use stance detection algorithms to filter for contradictory articles as well as for choosing the best contradictory opinion reply— by means of the furthest stance from the original post.

With reference to FIG. 6B, a relevancy of a target post (i.e., a post, for which it is determined negative social pressure is to be invoked) to entities of an enterprise is determined (612). In some examples, the process 600B of FIG. 6B is performed for each enterprise that is subscribed to the social media management platform. In some examples, relevancy is determined based on matching keywords/topics.

If it is determined that the target post is not relevant to any entities of the enterprise, one or more contradictory replies are generated (614) and articles within the content collection of the social bot are searched (616) to determine whether any article is relevant to the target post (618). In some examples, relevancy is determined based on matching keywords/topics (e.g., using TF/IDF). If an article is found, it is determined whether the article contradicts the target post and, for such articles, an opinion reply is generated (622). For example, an article can be determined to contradict the target post, if the article represents a positive sentiment.

If it is determined that the target post is relevant to an entity of the enterprise, candidate opinion replies are generated to depict the entity with a positive sentiment (624), and a search is conducted for articles relevant to the entity (626) with a most-relevant article being selected (628). A positive commentary is generated about the article (630) and a candidate reply is generated (632).

Of the generated replies, a reply having a highest confidence level is selected (634). It is determined whether the confidence level of the (selected) reply exceeds a threshold (636). If the confidence level of the reply exceeds the threshold, the reply is posted to the target post within the social media platform (638). If the confidence level of the reply does not meet the threshold, it is determined whether the social media platform provides functionality for negative reactions (640). If functionality for negative reactions is available, a negative reaction (e.g., dislike, downvote) is randomly selected (642) and the negative reaction is applied to the target post (644). If functionality for negative reactions is not available, a random reply is generated and posted to the target post (646).

Figure 6C:
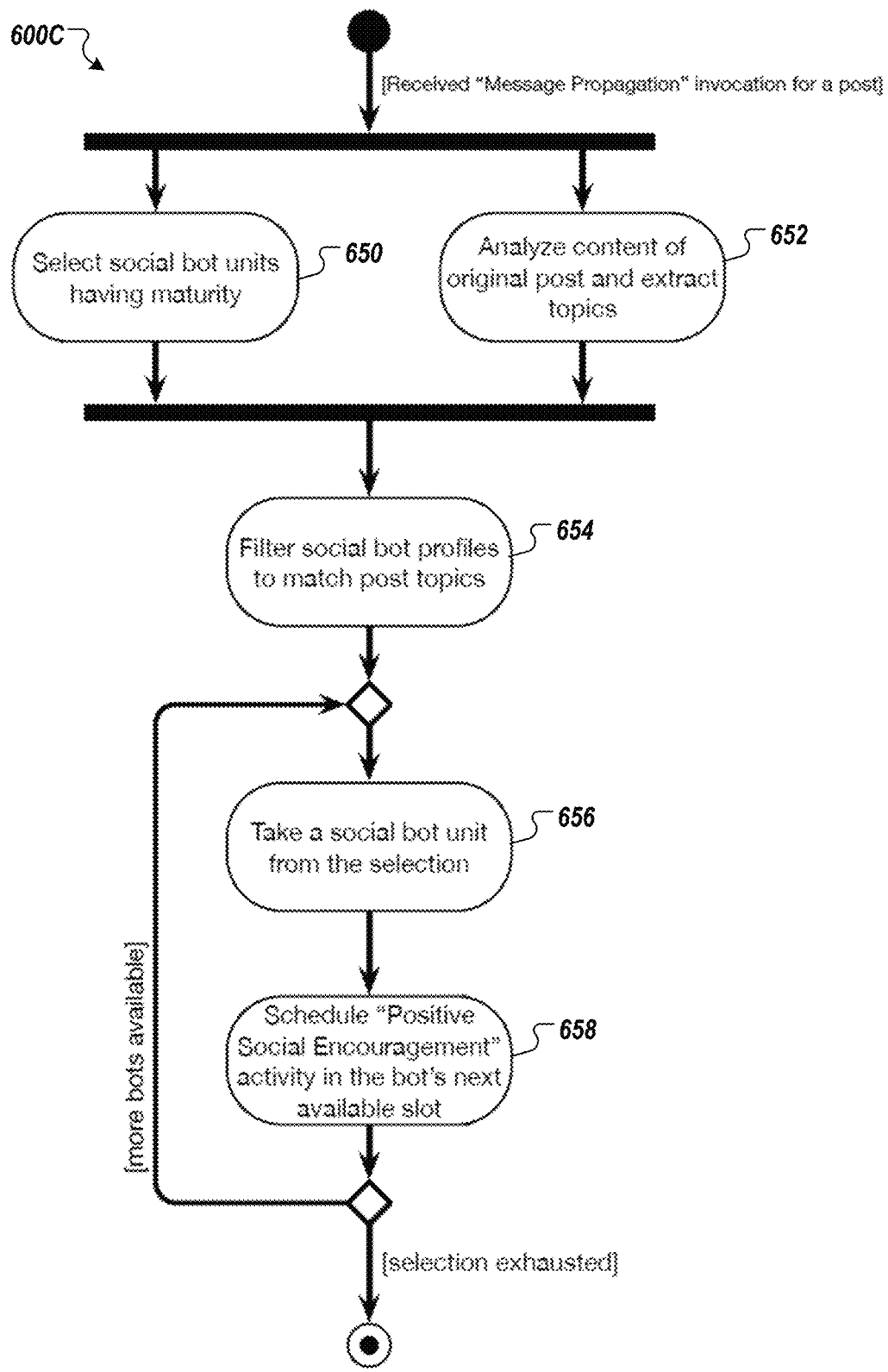

FIG. 6C depicts an example process 600C for message propagation. In some examples message propagation is executed to amplify a positive opinion about an enterprise. To this end, a social bot swarm reverberate the message or otherwise provides social approval to the original poster. In this manner, the actions of the social bot swarm encourage the original poster to create more positive messages about the enterprise. Furthermore, it may give the push needed to make that positive message viral. The social media management platform constructs the social bot swarm similar to the viral prevention activity, described herein.

With reference to FIG. 6C, it can be determined that a post has a positive sentiment. In response, a set of social bots is selected (650) and content of the target post is analyzed and topics extracted (652). In some examples, the set of social bots includes social bots that are of a sufficient maturity. Social bots in the set of social bots are filtered to provide a sub-set of social bots (654). In some examples, social bots not having interests that match the interests of the target post are filtered. A social bot is selected from the sub-set of social bots (656) and a positive social encouragement activity is scheduled for the social bot in a next timeslot that the social bot is scheduled to be active (658). This iterates over all social bots in the sub-set of social bots.

Figures 1, 6D:
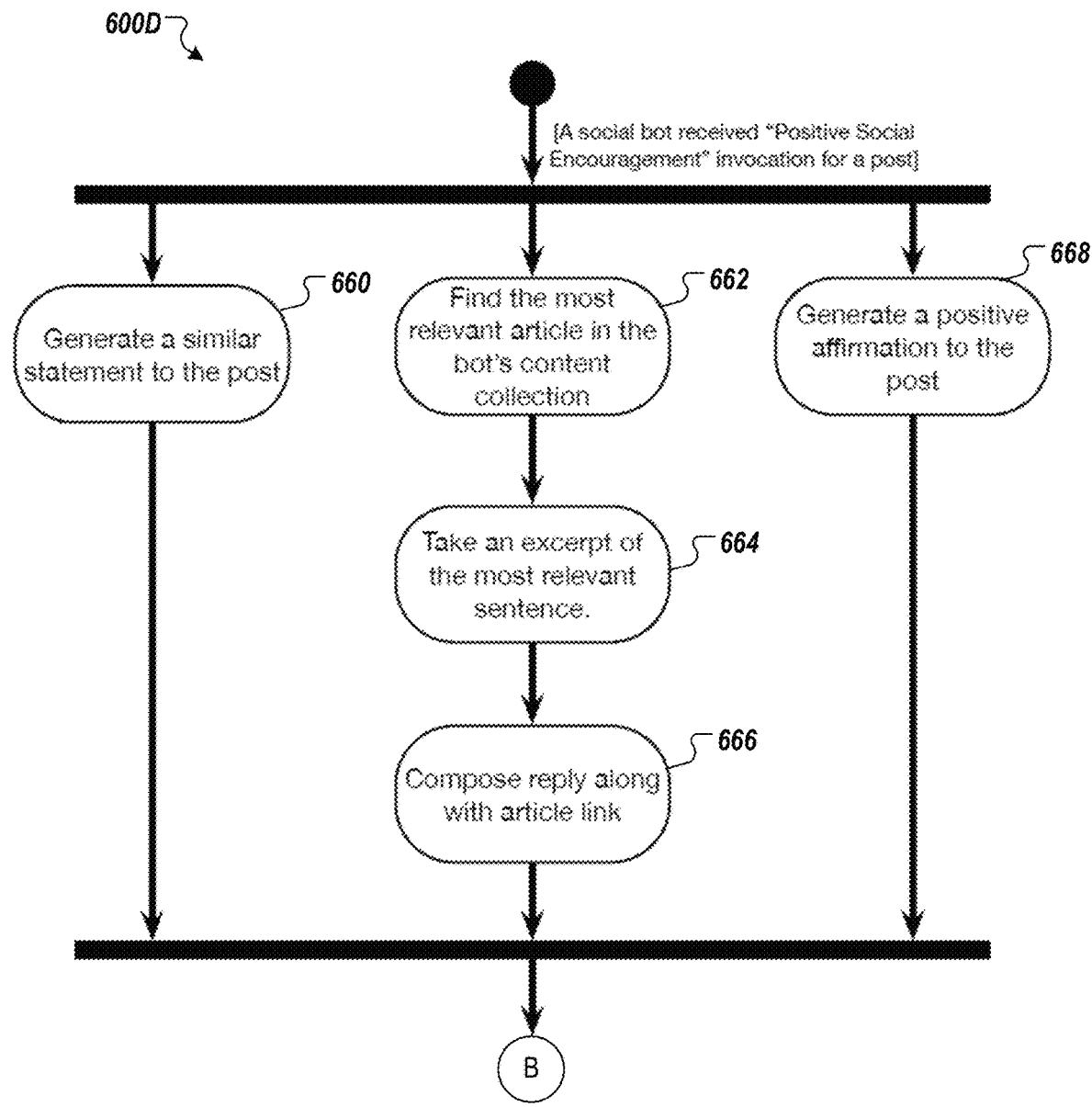
Figures 2, 6D:
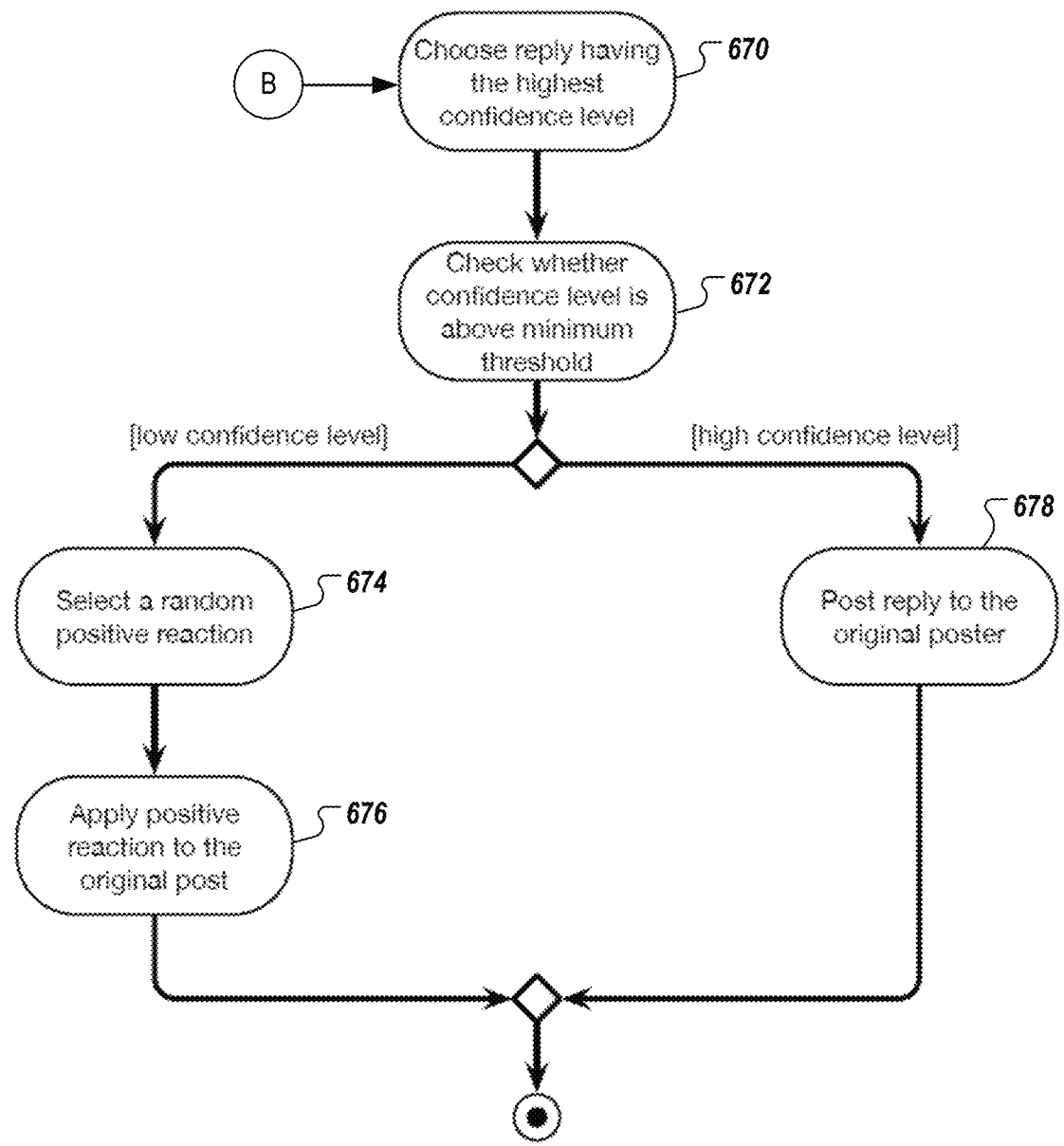

FIG. 6D depicts an example process 600D for positive social encouragement. In some examples, a social bot running the social encouragement activity starts by generating various potential replies to a target post, and selects the best reply to post, only if there is sufficient confidence that the reply is able to generate a quality response. If not, the social bot employs a simple positive reaction to the target post. In some examples, the social bot generates replies of each of a set of reply types. Example reply types include a similar statement to the target post (e.g., a paraphrase that serves as reverbs of an echo chamber), an excerpt of an article that agrees with the target post (e.g., to strengthen the original message), and a simple affirmation to the target post (e.g., to provide social approval). In some examples, the social bot selects an article taken from its own collection (which likely was located when it ran the article discovery activity). As a result, the post would be thematically in-line with the usual flow of posts from the social bot.

After generating a set of candidate replies, the social bot selects a reply having a highest quality and posts the reply to the target post in the social media platform. In the event that none of the candidate replies meet a quality threshold, the social bot can trigger a random positive reaction as a response (e.g., like, upvote, love, retweet). As described herein, the social bot can use generative NLP algorithms, such as GPT-2, to generate statements or affirmations.

With reference to FIG. 6D, in response to a target post having a positive sentiment, a similar statement is generated (660), a most-relevant article from the content collection of the social bot is identified (662), and a positive affirmation to the target post is generated (668). An excerpt of the article is generated using one or more sentences extracted from the article (664) and a reply is composed (666). A reply having the highest confidence level (e.g., determined as described above with reference to candidate replies) is selected (670) and it is determined whether the confidence level meets or exceeds a threshold (672). If the confidence level of the reply meets or exceeds the threshold, the reply is posted to the target post within the social media platform (678). If the confidence level of the reply does not meet the threshold, a positive reaction is randomly selected (674) and the positive reaction is applied to the target post (676).

Figure 7:
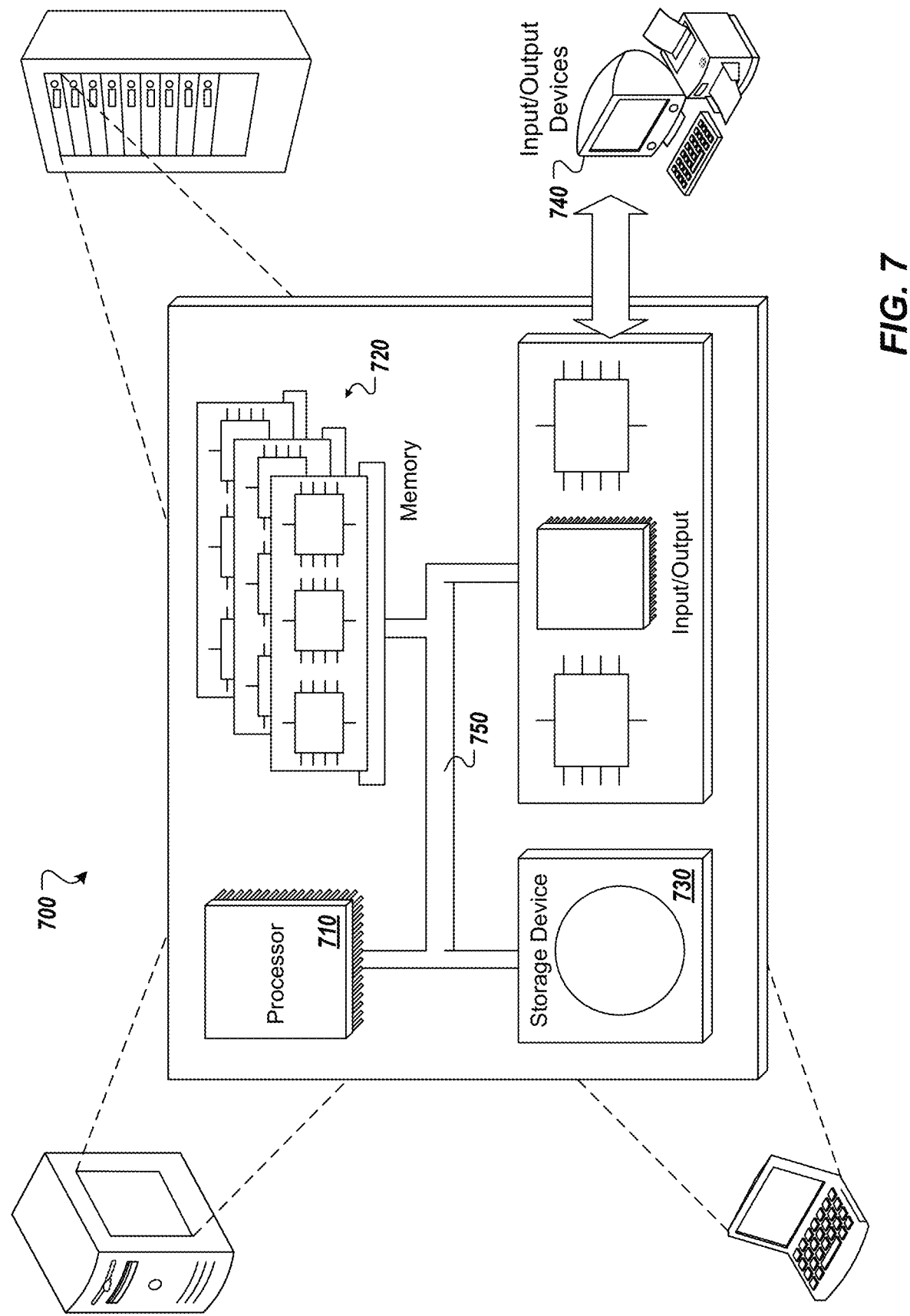
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for social bot-based, autonomous social media management of each of a plurality of enterprises, the method being executed by one or more processors and comprising:
   receiving, by a social media management platform, an incoming message on a social media platform of a plurality of social media platforms;
   determining, by the social media management platform, an enterprise of the plurality of enterprises that the incoming message is directed to;
   determining, by the social media management platform, a class of the incoming message from a set of classes;
   generating, by one of a public relations (PR) bot and a social bot of the social media management platform, a first reply to the message based on the class of the incoming message, the PR bot and the social bot each being specific to the enterprise and at least partially controlling a social media account of the enterprise on the social media platform;
   posting, by the one of the PR bot and the social bot, the first reply to the incoming message on the social media platform using the social media account; and
   at least partially in response to determining that the class is one of a complaint, a statement, and unknown, determining a potential virality of the incoming message;
   comparing the potential virality of the incoming message to a threshold virality; and
   in response to determining that the potential virality exceeds a threshold virality, triggering a swarm of social bots to mitigate virality of the incoming message.

2. The method of claim 1, wherein the class is determined from a set of classes comprising one of a question, a complaint, a compliment, a statement, and unknown.

3. The method of claim 1, wherein triggering a swarm of social bots comprises:

defining a set of social bots based on a maturity of social bots of the social media management platform, social bots in the set of social bots not being specific to the enterprise;

filtering one or more social bots from the set of social bots to provide a sub-set of social bots, the one or more social bots being filtered based on a relevance of each social bot to the incoming message; and for at least one social bot in the sub-set of social bots, executing an action relative to the incoming message within the social media platform.

4. The method of claim 3, wherein the action comprises posting a second reply to the incoming message within the social media platform, the second reply being included in a set of candidate replies automatically generated in response to the incoming message and being selected from the set of candidate replies based on respective confidence levels of candidate replies in the set of candidate replies.

5. The method of claim 1, further comprising:

randomly selecting a mode for the social bot; and executing, by the social bot, at least one activity within one or more of the social media platforms responsive to the mode, the at least one activity comprising one or more of connecting with one or more social media accounts in the one or more of the social media platforms, interacting with one or more social media accounts in the one or more of the social media platforms, discovering one or more articles, publishing one or more posts within the one or more social media platforms based on the one or more articles, and publishing one or more posts within the one or more social media platforms based on a generated opinion.

6. The method of claim 5, wherein publishing one or more posts within the one or more social media platforms based on the one or more articles and publishing one or more posts within the one or more social media platforms based on a generated opinion each at least partially comprises:

processing an article through one or more ML models to generate an article summary, an article excerpt, and an opinion statement on the article; and publishing at least one post comprising one or more of the article summary, the article excerpt, and the opinion statement.

7. A non-transitory computer-readable storage medium coupled to one or more processors and having instructions stored thereon which, when executed by the one or more processors, cause the one or more processors to perform operations for social bot-based, autonomous social media management of each of a plurality of enterprises, the operations comprising:

receiving, by a social media management platform, an incoming message on a social media platform of a plurality of social media platforms;

determining, by the social media management platform, an enterprise of the plurality of enterprises that the incoming message is directed to;

determining, by the social media management platform, a class of the incoming message from a set of classes;

generating, by one of a public relations (PR) bot and a social bot of the social media management platform, a first reply to the message based on the class of the incoming message, the PR bot and the social bot each being specific to the enterprise and at least partially controlling a social media account of the enterprise on the social media platform;

posting, by the one of the PR bot and the social bot, the first reply to the incoming message on the social media platform using the social media account; and at least partially in response to determining that the class is one of a complaint, a statement, and unknown, determining a potential virality of the incoming message;

comparing the potential virality of the incoming message to a threshold virality; and in response to determining that the potential virality exceeds a threshold virality, triggering a swarm of social bots to mitigate virality of the incoming message.

8. The non-transitory computer-readable storage medium of claim 7, wherein the class is determined from a set of classes comprising one of a question, a complaint, a compliment, a statement, and unknown.

9. The non-transitory computer-readable storage medium of claim 7, wherein triggering a swarm of social bots comprises:

defining a set of social bots based on a maturity of social bots of the social media management platform, social bots in the set of social bots not being specific to the enterprise;

filtering one or more social bots from the set of social bots to provide a sub-set of social bots, the one or more social bots being filtered based on a relevance of each social bot to the incoming message; and for at least one social bot in the sub-set of social bots, executing an action relative to the incoming message within the social media platform.

10. The non-transitory computer-readable storage medium of claim 9, wherein the action comprises posting a second reply to the incoming message within the social media platform, the second reply being included in a set of candidate replies automatically generated in response to the incoming message and being selected from the set of candidate replies based on respective confidence levels of candidate replies in the set of candidate replies.

11. The non-transitory computer-readable storage medium of claim 7, wherein operations further comprise:

randomly selecting a mode for the social bot; and executing, by the social bot, at least one activity within one or more of the social media platforms responsive to the mode, the at least one activity comprising one or more of connecting with one or more social media accounts in the one or more of the social media platforms, interacting with one or more social media accounts in the one or more of the social media platforms, discovering one or more articles, publishing one or more posts within the one or more social media platforms based on the one or more articles, and publishing one or more posts within the one or more social media platforms based on a generated opinion.

12. The non-transitory computer-readable storage medium of claim 11, wherein publishing one or more posts within the one or more social media platforms based on the one or more articles and publishing one or more posts within the one or more social media platforms based on a generated opinion each at least partially comprises:

processing an article through one or more ML models to generate an article summary, an article excerpt, and an opinion statement on the article; and publishing at least one post comprising one or more of the article summary, the article excerpt, and the opinion statement.

13. A system, comprising:

a computing device; and a computer-readable storage device coupled to the computing device and having instructions stored thereon which, when executed by the computing device, cause the computing device to perform operations for natural language explanations for social bot-based, autonomous social media management of each of a plurality of enterprises, the operations comprising:

receiving, by a social media management platform, an incoming message on a social media platform of a plurality of social media platforms;

determining, by the social media management platform, an enterprise of the plurality of enterprises that the incoming message is directed to;

determining, by the social media management platform, a class of the incoming message from a set of classes;

generating, by one of a public relations (PR) bot and a social bot of the social media management platform, a first reply to the message based on the class of the incoming message, the PR bot and the social bot each being specific to the enterprise and at least partially controlling a social media account of the enterprise on the social media platform;

posting, by the one of the PR bot and the social bot, the first reply to the incoming message on the social media platform using the social media account; and at least partially in response to determining that the class is one of a complaint, a statement, and unknown, determining a potential virality of the incoming message;

comparing the potential virality of the incoming message to a threshold virality; and in response to determining that the potential virality exceeds a threshold virality, triggering a swarm of social bots to mitigate virality of the incoming message.

14. The system of claim 13, wherein the class is determined from a set of classes comprising one of a question, a complaint, a compliment, a statement, and unknown.

15. The system of claim 13, wherein triggering a swarm of social bots comprises:

defining a set of social bots based on a maturity of social bots of the social media management platform, social bots in the set of social bots not being specific to the enterprise;

filtering one or more social bots from the set of social bots to provide a sub-set of social bots, the one or more social bots being filtered based on a relevance of each social bot to the incoming message; and for at least one social bot in the sub-set of social bots, executing an action relative to the incoming message within the social media platform.

16. The system of claim 15, wherein the action comprises posting a second reply to the incoming message within the social media platform, the second reply being included in a set of candidate replies automatically generated in response to the incoming message and being selected from the set of candidate replies based on respective confidence levels of candidate replies in the set of candidate replies.

17. The system of claim 13, wherein operations further comprise:

randomly selecting a mode for the social bot; and executing, by the social bot, at least one activity within one or more of the social media platforms responsive to the mode, the at least one activity comprising one or more of connecting with one or more social media accounts in the one or more of the social media platforms, interacting with one or more social media accounts in the one or more of the social media platforms, discovering one or more articles, publishing one or more posts within the one or more social media platforms based on the one or more articles, and publishing one or more posts within the one or more social media platforms based on a generated opinion.

* * * * *